United States Patent
Kumar et al.

(10) Patent No.: US 11,812,383 B2
(45) Date of Patent: Nov. 7, 2023

(54) APPARATUS AND METHOD FOR POSITIONING ENHANCEMENTS WITH WAKE-UP SIGNAL (WUS) CONFIGURATIONS

(71) Applicant: QUALCOMM Incorporated, San Diego, CA (US)

(72) Inventors: Akash Kumar, Hyderabad (IN); Stephen William Edge, Escondido, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 161 days.

(21) Appl. No.: 17/362,618

(22) Filed: Jun. 29, 2021

(65) Prior Publication Data
US 2022/0417853 A1    Dec. 29, 2022

(51) Int. Cl.
| | |
|---|---|
| H04W 52/02 | (2009.01) |
| H04W 8/24 | (2009.01) |
| H04W 24/10 | (2009.01) |
| H04W 64/00 | (2009.01) |

(52) U.S. Cl.
CPC ......... *H04W 52/0232* (2013.01); *H04W 8/24* (2013.01); *H04W 24/10* (2013.01); *H04W 64/006* (2013.01)

(58) Field of Classification Search
None
See application file for complete search history.

(56) References Cited

U.S. PATENT DOCUMENTS

| | | | |
|---|---|---|---|
| 2015/0215929 A1* | 7/2015 | Damnjanovic | ... H04W 72/0446 370/241 |
| 2021/0050978 A1 | 2/2021 | Manolakos et al. | |
| 2022/0086791 A1* | 3/2022 | Cui | ........................ G01S 5/0036 |
| 2022/0394682 A1* | 12/2022 | Nory | ................. H04W 72/0453 |
| 2022/0400434 A1* | 12/2022 | Seo | ........................ H04W 72/12 |

FOREIGN PATENT DOCUMENTS

| | | | |
|---|---|---|---|
| EP | 3310102 A1 | 4/2018 | |
| WO | WO-2021162515 A1 * | 8/2021 | ............ H04W 64/00 |
| WO | WO-2022009160 A1 * | 1/2022 | |

OTHER PUBLICATIONS

International Search Report and Written Opinion—PCT/US2022/031943—ISA/EPO—dated Oct. 4, 2022.

\* cited by examiner

*Primary Examiner* — Ajit Patel
*Assistant Examiner* — Angelie T Ngo
(74) *Attorney, Agent, or Firm* — Weaver Austin Villeneuve & Sampson LLP

(57) ABSTRACT

During a positioning session, a wake up signal (WUS) configuration for a user equipment (UE) operating in a discontinuous reception (DRX) mode may be adapted to avoid dormant secondary serving cells (SCells) for positioning. The location server, for example, may configure positioning assistance data and scheduling of uplink sounding reference signals (SRS) to exclude SCells that are included in a dormancy list for the UE. The location server, alternatively, may provide to a serving base station supporting a primary serving cell (PCell) for the UE an indication of the SCells to be used for positioning. The SCells may be removed from the dormancy list during the positioning session or may be brought out of dormancy for all or selected monitoring occasions during the positioning session.

32 Claims, 14 Drawing Sheets

APPARATUS AND METHOD FOR POSITIONING ENHANCEMENTS WITH WAKE-UP SIGNAL (WUS) CONFIGURATIONS

FIELD OF THE DISCLOSURE

Subject matter disclosed herein relates to location determination for a mobile device and more particularly to supporting a location determination for a user equipment supporting wave-up signals (WUS) in a discontinuous reception (DRX) mode.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor.

Obtaining the location of a mobile device that is accessing a wireless (e.g. 5G) network may be useful for many applications including, for example, emergency calls, personal navigation, asset tracking, locating a friend or family member, etc. However, in many applications it is desirable to reduce power consumption.

SUMMARY

During a positioning session, the wake up signal (WUS) configuration for a user equipment (UE) operating in a discontinuous reception (DRX) mode may be adapted to avoid dormant secondary serving cells (SCells) for positioning. The location server, for example, may configure positioning assistance data and scheduling of uplink sounding reference signals (SRS) to exclude SCells that are included in a dormancy list for the UE. The location server, alternatively, may provide to a serving base station supporting a primary serving cell (PCell) for the UE an indication of the SCells to be used for positioning. The SCells may be removed from the dormancy list during the positioning session or may be brought out of dormancy for all or selected monitoring occasions during the positioning session.

In one implementation, a method performed by a location server for positioning a user equipment (UE) operating with wake-up signal (WUS) configurations in a discontinuous reception (DRX) mode during a positioning session, includes receiving a dormancy configuration for secondary serving cells (SCells) for the UE in a WUS configuration for the UE; and in response to the dormancy configuration for the SCells for the UE, performing one of: configuring and sending to the UE assistance data and scheduling uplink sounding reference signals (SRSs) for SCells that are not included in the dormancy configuration for the SCells for the UE; or sending an indication to a serving base station for the UE supporting a primary serving cell (PCell) for the UE to remove one or more SCells from the dormancy configuration during the positioning session; or sending an indication to the serving base station for the UE supporting the PCell for the UE to bring one or more SCells out of dormancy for one or more WUS monitoring occasions during the positioning session.

In one implementation, a location server configured for positioning a user equipment (UE) operating with wake-up signal (WUS) configurations in a discontinuous reception (DRX) mode during a positioning session, includes an external interface configured to wirelessly communicate with base stations in a wireless network; at least one memory; at least one processor coupled to the external interface and the at least one memory, wherein the at least one processor is configured to: receive, via the external interface, a dormancy configuration for secondary serving cells (SCells) for the UE in a WUS configuration for the UE; and in response to the dormancy configuration for the SCells for the UE, the at least one processor is configured to performs one of: configure and send, via the external interface, to the UE assistance data and scheduling uplink sounding reference signals (SRSs) for SCells that are not included in the dormancy configuration for the SCells for the UE; or send, via the external interface, an indication to a serving base station for the UE supporting a primary serving cell (PCell) for the UE to remove one or more SCells from the dormancy configuration during the positioning session; or send, via the external interface, an indication to the serving base station for the UE supporting the PCell for the UE to bring one or more SCells out of dormancy for one or more WUS monitoring occasions during the positioning session.

In one implementation, a location server configured for positioning a user equipment (UE) operating with wake-up signal (WUS) configurations in a discontinuous reception (DRX) mode during a positioning session, includes means for receiving a dormancy configuration for secondary serving cells (SCells) for the UE in a WUS configuration for the UE; and in response to the dormancy configuration for the SCells for the UE, one of: means for configuring and sending to the UE assistance data and scheduling uplink sounding reference signals (SRSs) for SCells that are not included in the dormancy configuration for the SCells for the UE; or means for sending an indication to a serving base station for the UE supporting a primary serving cell (PCell) for the UE to remove one or more SCells from the dormancy configuration during the positioning session; or means for sending an indication to the serving base station for the UE supporting the PCell for the UE to bring one or more SCells out of dormancy for one or more WUS monitoring occasions during the positioning session.

In one implementation, a non-transitory computer readable storage medium including program code stored thereon, the program code is operable to configure at least one processor in a location server for positioning a user equipment (UE) operating with wake-up signal (WUS) configurations in a discontinuous reception (DRX) mode during a positioning session, the program code comprising instructions to: receive a dormancy configuration for secondary serving cells (SCells) for the UE in a WUS configuration for the UE; and in response to the dormancy configuration for the SCells for the UE, perform one of: configure and send to the UE assistance data and scheduling uplink sounding reference signals (SRSs) for SCells that are not included in the dormancy configuration for the SCells for the UE; or send an indication to a serving base station for the UE supporting a primary serving cell (PCell) for the UE to remove one or more SCells from the dormancy configuration during the positioning session; or send an indication to the serving base station for the UE supporting the PCell for the UE to bring one or more SCells out of dormancy for one or more WUS monitoring occasions during the positioning session.

In one implementation, a method performed by a serving base station supporting a primary serving cell (PCell) for positioning a user equipment (UE) operating with wake-up signal (WUS) configurations in a discontinuous reception (DRX) mode during a positioning session includes sending to the UE a WUS configuration including a dormancy list of secondary serving cells (SCells) for the UE that are configured for dormancy; receiving from a location server an indication of one or more SCells that are to be used for positioning for the UE; removing one or more of the SCells on the dormancy list from dormancy during the positioning session based on the indication received from the location server.

In one implementation, a serving base station configured for supporting a primary serving cell (PCell) for positioning a user equipment (UE) operating with wake-up signal (WUS) configurations in a discontinuous reception (DRX) mode during a positioning session includes an external interface configured to wirelessly communicate with entities in a wireless network; at least one memory; at least one processor coupled to the external interface and the at least one memory, wherein the at least one processor is configured to: send, via the external interface, to the UE a WUS configuration including a dormancy list of secondary serving cells (SCells) for the UE that are configured for dormancy; receive, via the external interface, from a location server an indication of one or more SCells that are to be used for positioning for the UE; remove one or more of the SCells on the dormancy list from dormancy during the positioning session based on the indication received from the location server.

In one implementation, a serving base station configured for supporting a primary serving cell (PCell) for positioning a user equipment (UE) operating with wake-up signal (WUS) configurations in a discontinuous reception (DRX) mode during a positioning session includes means for sending to the UE a WUS configuration including a dormancy list of secondary serving cells (SCells) for the UE that are configured for dormancy; means for receiving from a location server an indication of one or more SCells that are to be used for positioning for the UE; means for removing one or more of the SCells on the dormancy list from dormancy during the positioning session based on the indication received from the location server.

In one implementation, a non-transitory computer readable storage medium including program code stored thereon, the program code is operable to configure at least one processor in a serving base station for supporting a primary serving cell (PCell) for positioning a user equipment (UE) operating with wake-up signal (WUS) configurations in a discontinuous reception (DRX) mode during a positioning session, the program code comprising instructions to: send to the UE a WUS configuration including a dormancy list of secondary serving cells (SCells) for the UE that are configured for dormancy; receive from a location server an indication of one or more SCells that are to be used for positioning for the UE; remove one or more of the SCells on the dormancy list from dormancy during the positioning session based on the indication received from the location server.

In one implementation, a method performed by a user equipment (UE) for positioning while operating with wake-up signal (WUS) configurations in a discontinuous reception (DRX) mode during a positioning session includes receiving from a serving base station supporting a primary cell (PCell) a WUS configuration including a dormancy list of secondary serving cells (SCells) for the UE that are configured for dormancy; receiving a capabilities request message from a location server during the positioning session; and sending a capabilities response message to the location server with the dormancy list.

In one implementation, a user equipment (UE) configured for positioning while operating with wake-up signal (WUS) configurations in a discontinuous reception (DRX) mode during a positioning session includes a wireless transceiver configured to wirelessly communicate with base stations in a wireless network; at least one memory; at least one processor coupled to the wireless transceiver and the at least one memory, wherein the at least one processor is configured to: receive, via the wireless transceiver, from a serving base station supporting a primary cell (PCell) a WUS configuration including a dormancy list of secondary serving cells (SCells) for the UE that are configured for dormancy; receive, via the wireless transceiver, a capabilities request message from a location server during the positioning session; and send, via the wireless transceiver, a capabilities response message to the location server with the dormancy list.

In one implementation, a user equipment (UE) configured for positioning while operating with wake-up signal (WUS) configurations in a discontinuous reception (DRX) mode during a positioning session includes means for receiving from a serving base station supporting a primary cell (PCell) a WUS configuration including a dormancy list of secondary serving cells (SCells) for the UE that are configured for dormancy; means for receiving a capabilities request message from a location server during the positioning session; and means for sending a capabilities response message to the location server with the dormancy list.

In one implementation, a non-transitory computer readable storage medium including program code stored thereon, the program code is operable to configure at least one processor in a user equipment (UE) for positioning while operating with wake-up signal (WUS) configurations in a discontinuous reception (DRX) mode during a positioning session, the program code comprising instructions to: receive from a serving base station supporting a primary cell (PCell) a WUS configuration including a dormancy list of secondary serving cells (SCells) for the UE that are configured for dormancy; receive a capabilities request message from a location server during the positioning session; and send a capabilities response message to the location server with the dormancy list.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
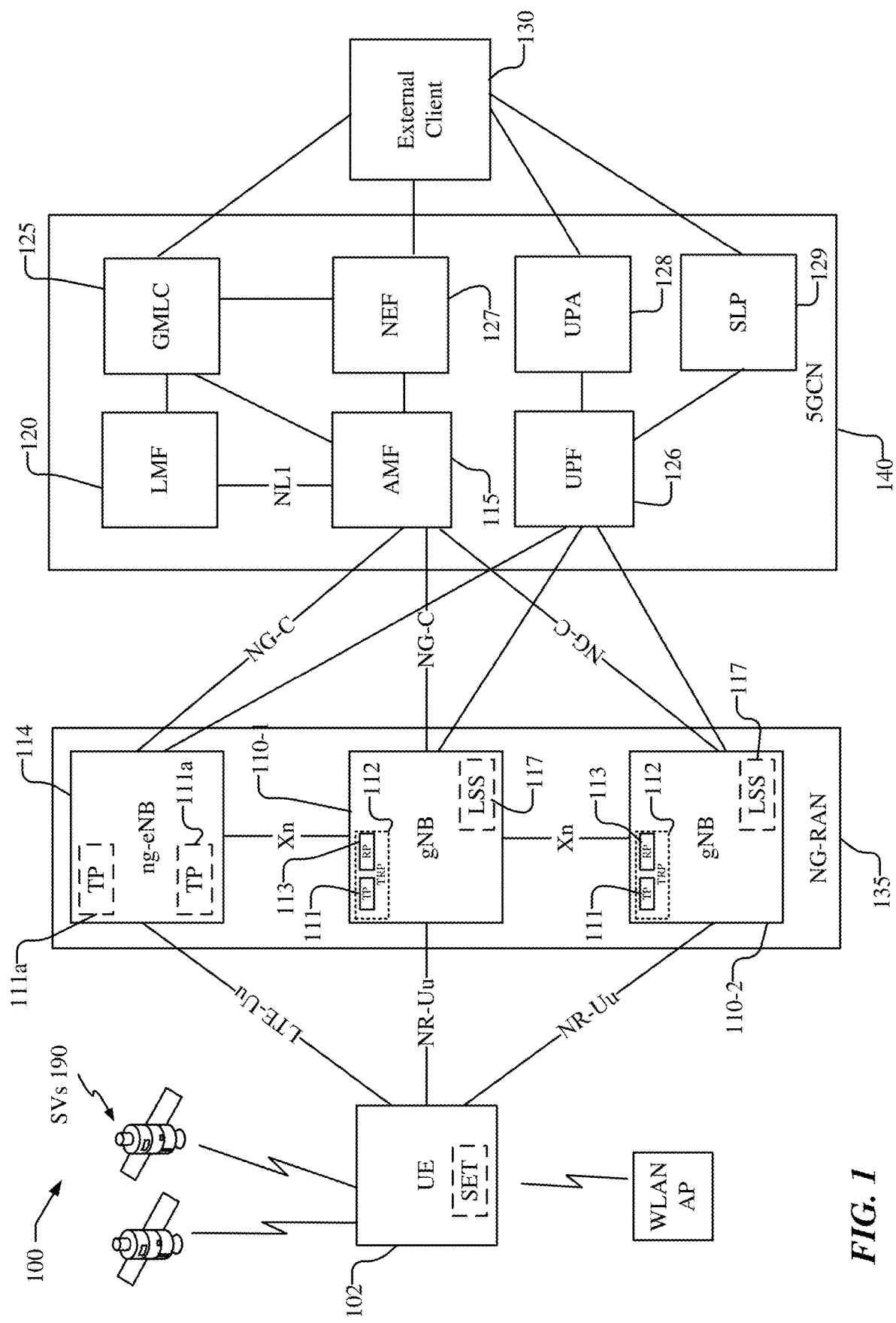
FIG. 1 illustrates a positioning architecture diagram of a communication system.

Like reference symbols in the various drawings indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. element 110 in the previous example would refer to elements 110-1, 110-2, 110-3).

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, wearable (e.g., smartwatch, glasses, augmented reality (AR)/virtual reality (VR) headset, etc.), vehicle (e.g., automobile, motorcycle, bicycle, etc.), Internet of Things (IoT) device, Industrial IoT (IIOT) etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

FIG. 1 shows a positioning architecture diagram of a communication system 100 that may support positioning of a UE operating with wake-up signal (WUS) configurations in a discontinuous reception (DRX) mode during a positioning session as discussed herein. The location management functionality may be located in the 5G Core Network (5GCN) 140 and/or in the NG-RAN 135, e.g., in a "Location Server Surrogate (LSS)" or a "Location Management Component (LMC)" and in one or more of the gNBs 110 in FIG. 1 or may be external to the gNBs 110 but within the NG-RAN 135.

The communication system 100 may be configured for supporting location of a user equipment (UE) 102. Here, the communication system 100 comprises a UE 102, and components of a Fifth Generation (5G) network comprising a Next Generation (NG) Radio Access Network (RAN) (NG-RAN) 135 and a 5G Core Network (5GCN) 140. A 5G network may also be referred to as a New Radio (NR) network; NG-RAN 135 may be referred to as a 5G RAN or as an NR RAN; and 5GCN 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger (or smaller) number of SVs 190, gNBs 110, next generation evolved Node Bs (ng-eNBs) 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure, in response to receiving a request, an increased quantity of location-related information or resources associated with broadcast communication from wireless nodes (e.g. broadcast of assistance data), transmission of Positioning Reference Signals (PRSs) or some other location related function of the wireless nodes.

The UE 102 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 102 may correspond to a cellphone, smartphone, laptop, tablet, PDA, navigation device, Internet of Things (IoT) device, or some other portable or moveable device. Typically, though not necessarily, the UE 102 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GCN 140), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (via elements of 5GCN 140 not shown in FIG. 1, or possibly via a Gateway Mobile Location Center (GMLC) 125) and/or allow the external client 130 to receive location information regarding the UE 102 (e.g., via the GMLC 125).

The UE 102 may include a single entity or may include multiple entities such as in a personal area network where a user may employ audio, video and/or data I/O devices and/or body sensors and a separate wireline or wireless modem. An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.) A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise NR NodeBs, also referred to as gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 102 via wireless communication between the UE 102 and one or more of the gNBs 110, which may provide wireless communications access to the 5GCN 140 on behalf of the UE 102 using 5G NR. 5G NR radio access may also be referred to as NR radio access or as 5G radio access. In FIG. 1, the serving gNB for UE 102 is assumed to be gNB 110-1, although other gNBs (e.g. gNB 110-2) may act as a serving gNB if UE 102 moves to another location or may act as a secondary gNB to provide additional throughout and bandwidth to UE 102. A Location Server Surrogate (LSS) 117 within a node in the NG-RAN 135, such as in serving gNB 110-1, may perform a location server function, as discussed herein.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 102. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 102 but may not receive signals from UE 102 or from other UEs. It is noted that while only one ng-eNB 114 is shown in FIG. 1, some embodiments may include multiple ng-eNBs 114.

In 5G, the frequency spectrum in which wireless nodes (e.g., base stations 110-1, 110-2, and 114, UE 102) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 102 and the cell in which the UE 102 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 102 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 102 in a cell may have different downlink primary carriers. The same is true for the uplink primary carriers. The network is able to change the primary carrier of any UE 102 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the base stations 110 may be an anchor carrier (or "PCell") and other frequencies utilized by the base stations 110 may be secondary carriers ("SCells"). The simultaneous transmission and/or reception of multiple carriers enables the UE 102 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

A location server in FIG. 1 may correspond to, e.g., Location Management Function (LMF) 120, Secure User Plane Location (SUPL) Location Platform (SLP) 129 in the 5GCN 140, a Location Server Surrogate (LSS) 117 (or a Location Management Component (LMC)) in the NG-RAN 135, or a gNB 110. Such a location server may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs) and/or signal, timing and orbital information for GNSS SVs to facilitate positioning techniques such as A-GNSS, AFLT, AoD, downlink (DL) TDOA, RTT, and ECID. The facilitation may include improving signal acquisition and measurement accuracy by UE 102 and, in some cases, enabling UE 102 to compute its estimated location based on the location measurements. For example, a location server (e.g. LMF 120 or SLP 129) may have access to an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 102 and a cellular transceiver (e.g. a gNB) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 120 or SLP 129) or broadcast by a base station (e.g. a gNB 110-1, 110-2) in NG-RAN 135 to determine a location for UE 102.

As noted, while FIG. 1 depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 102, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1.

The gNBs 110 and ng-eNB 114 can communicate with an Access and Mobility Management Function (AMF) 115, which, for positioning functionality may communicates with a Location Management Function (LMF) 120. The AMF 115 may support mobility of the UE 102, including cell change and handover and may participate in supporting a signaling connection to the UE 102 and possibly data and voice bearers for the UE 102. The LMF 120 may support positioning of the UE 102 when UE accesses the NG-RAN 135 and may support position procedures/methods such as Assisted GNSS (A-GNSS), Time Difference of Arrival (TDOA), Real Time Kinematics (RTK), Precise Point Positioning (PPP), Differential GNSS (DGNSS), Enhanced Cell ID (ECID), angle of arrival (AOA), angle of departure (ADD), and/or other positioning procedures. The LMF 120 may also process location services requests for the UE 102, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 102's location) may be performed at the UE 102 (e.g., using signal measurements obtained by UE 102 for signals transmitted by wireless nodes such as gNBs 110 and ng-eNB 114, and assistance data provided to the UE 102, e.g. by LMF 120). In the case of OMA SUPL location, the location server may be a SUPL Location Platform (SLP) as opposed to the LMF 120.

The Gateway Mobile Location Center (GMLC) 125 may support a location request for the UE 102 received from an external client 130 and may forward such a location request to the AMF 115 for forwarding by the AMF 115 to the LMF 120 or may forward the location request directly to the LMF 120. A location response from the LMF 120 or an LSS 117 (e.g. containing a location estimate for the UE 102) may be returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

The gNB 110-1 may support positioning of the UE 102 when UE 102 accesses the NG-RAN 135. The gNB 110-1 may also process location service requests for the UE 102, e.g., received directly or indirectly from the GMLC 125. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 129. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

To support services including location services from external clients 130 for Internet of Things (IoT) UEs, a Network Exposure Function (NEF) 127 may be included in 5GCN 140. The NEF 127 may support secure exposure of capabilities and events concerning 5GCN 140 and UE 102 to an external client 130 and may enable secure provision of information from external client 130 to 5GCN 140. In the context of location services, NEF 127 may function to obtain a current or last known location for a UE 102, may obtain an indication of a change in location for a UE 102, or an indication of when a UE 102 becomes available (or reachable). The NEF 127 may be connected to the GMLC 125 to support last known location, current location and/or deferred periodic and triggered location for the UE 102. If desired, the NEF 127 may include, or may be combined with, the GMLC 125 and may then obtain location information for UE 102 directly from LSS 117 or LMF 120 (e.g. may be connected to the LSS 117 or the LMF 120). NEF 127 may also be connected to AMF 115 to enable NEF 127 to obtain a location for UE 102 from the AMF 115.

The User Plane Function (UPF) 126 may support voice and data bearers for UE 102 and may enable UE 102 voice and data access to other networks such as the Internet. UPF 126 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. A location report for UE 102, e.g., including a location estimate determined by the LSS 117 in or attached to the serving gNB 110-1, may be returned by gNB 110-1 to the external client 130 via the UPF 126 and a User Plane Aggregator (UPA) 128 if present. UPF 126 may be connected to SLP 129 to enable support of location of UE 102 using SUPL. SLP 129 may be further connected to or accessible from external client 130.

The UPA 128 is optional and enables an external client 130 to receive location reports for a UE 102 by interacting only with the UPA 128. When a UPA 128 is not present and when an LSS 117 transfers a location for UE 102 to an external client 130 via user plane signaling, the external client 130 could need to directly interact with the gNB 110-1 for the UE 102, which may be less efficient (e.g. when the gNB 110-1 for a target UE 102 is changed) and/or may be a security risk for gNBs and/or the external client 130. The UPA 128 avoids the need for a gNB 110-1 (or LSS 117) to establish location reporting sessions to multiple external clients and for external clients to establish location reporting sessions to multiple gNBs 110. The UPA 128 may also provide security for the NG-RAN 112 and/or the external client 130 by authenticating and authorizing the external client 130 and/or gNB 110-1 (or LSS 117). The UPA 128 may be part of the 5GCN 150 or may be external to the 5GCN 150 (e.g. may be associated with the external client 130). In some implementations, the UPA 128 may be part of the LMF 120, GMLC 125, or may be connected to the LMF 120 or GMLC 125. A UPA 128 may also be referred to as a router, an IP router, a UP router or as a routing function.

The LMF 120 may communicate with the gNBs 110 and/or with the ng-eNB 114 using a New Radio Position Protocol A (NRPPa), which may be defined in 3GPP Technical Specification (TS) 38.455. NRPPa messages may be transferred between a gNB 110 and the LMF 120, and/or between an ng-eNB 114 and the LMF 120, via the AMF 115. LMF 120 and UE 102 may communicate using an LTE Positioning Protocol (LPP), which may be defined in 3GPP TS 37.355. Here, LPP messages may be transferred between the UE 102 and the LMF 120 via the AMF 115 and a serving gNB 110-1 or serving ng-eNB 114 for UE 102. For example, LPP messages may be transferred between the LMF 120 and the AMF 115 using a service based protocol (e.g. based on the Hypertext Transfer Protocol (HTTP)) and may be transferred between the AMF 115 and the UE 102 using a 5G Non-Access Stratum (NAS) protocol. The LPP protocol may be used to support positioning of UE 102 using UE assisted and/or UE based position methods such as A-GNSS, RTK, TDOA and/or ECID. The NRPPa protocol may be used to support positioning of UE 102 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

With a UE assisted position method, UE 102 may obtain location measurements and send the measurements to a location server (e.g. LMF 120, SLP 129, or an LSS 117 (or LMC) within a node in the NG-RAN 135, such as in serving gNB 110-1) for computation of a location estimate for UE 102. For example, the location measurements may include one or more of a Received Signal Strength Indication (RSSI), Round Trip signal propagation Time (RTT), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 102 may obtain location measurements (e.g. which may be the same as or similar to location measurements for a UE assisted position method) and may compute a location of UE 102 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or Time Of Arrival (TOA)) for signals transmitted by UE 102, and/or may receive measurements obtained by UE 102, and may send the measurements to a location server (e.g. LMF 120, SLP 129, or an LSS 117 (or LMC) within a node in the NG-RAN 135, such as in serving gNB 110-1) for computation of a location estimate for UE 102.

Information provided by the gNBs 110 and/or ng-eNB 114 to the location server, e.g., LMF 120 using NRPPa or to an LSS 117 within a node in the NG-RAN 135, such as in serving gNB 110-1 using XnAP, may include timing and configuration information for PRS transmission and location coordinates. The location server may then provide some or all of this information to the UE 102 as assistance data in an LPP message via the NG-RAN 135 and the 5GC 140.

An LPP message sent from the location server to the UE 102 may instruct the UE 102 to do any of a variety of things, depending on desired functionality. For example, the LPP message could contain an instruction for the UE 102 to obtain measurements for GNSS (or A-GNSS), WLAN, and/or TDOA (or some other position method). In the case of TDOA, the LPP message may instruct the UE 102 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 102 of a signal (e.g. a PRS signal) transmitted or broadcast by one gNB 110 and a similar signal transmitted by another gNB 110. The UE 102 may send the measurements back to the location server, e.g., to the LMF 120 in an LPP message (e.g. inside a 5G NAS message) via the serving gNB 110-1 (or serving ng-eNB 114) and the AMF 115 or to the LSS 117 within a node in the NG-RAN 135, such as in serving gNB 110-1.

As noted, while the communication system 100 is described in relation to 5G technology, the communication system 100 may be implemented to support other communication technologies, such as GSM, WCDMA, LTE, etc., that are used for supporting and interacting with mobile devices such as the UE 102 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1) in the 5GC 140. For example, the WLAN may support IEEE 802.11 WiFi access for UE 102 and may comprise one or more WiFi APs. Here, the N3IWF may connect to the WLAN and to other elements in the 5GC 140 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 102. In these other embodiments, on-demand resource allocation for positioning of a UE 102 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

It should be noted that the gNBs 110 and ng-eNB 114 may not always both be present in the NG-RAN 135. Moreover, when both the gNBs 110 and ng-eNB 114 are present, the NG interface with the AMF 115 may only present for one of them.

As illustrated, a gNB 110 may be allowed to control one or more Transmission Points (TPs) 111, such as broadcast-only TPs for improved support of DL position methods such as TDOA or ECID. Additionally, a gNB 110 may be allowed to control one or more Reception Points (RPs) 113, such as internal Location Measurement Units (LMUs) for UL measurements for position methods such as UTDOA or ECID. The TPs 111 and RPs 113 may be combined into, or defined to be part of, a Transmission Reception Point (TRP) 112 to support downlink (DL) and/or uplink (UL) position methods, such as TDOA, UL-TDOA and multi-cell Round Trip signal propagation Time (RTT). Further, a gNB 110 may be allowed to include a Location Server Surrogate (LSS) 117 to support positioning of a target UE 102 by a serving gNB 110. LSS 117 (or LMC) may support some or all of the same functions as LMF 120, with the difference that LSS 117 is located in NG-RAN 135, whereas LMF 120 is located in 5GCN 140. The term "Location Server Surrogate" is used herein for the NG-RAN location management functionality, but other terms may be used, such as "Local-LMF" or "NG-RAN LMF," etc. Positioning of a UE 102 by a serving gNB 110 can be used to provide a location service to a UE 102, serving AMF 115 or LMF 120 and to improve NG-RAN operation—e.g. by reducing the latency of position determination and increasing the number of UEs 102 for which location can be supported.

As illustrated, the ng-eNB 114 may control one or more TPs 111a, which may use different protocols than TPs 111 in gNBs 110-1 and 110-2, e.g., the TPs 111a may use protocols related to LTE, while TPs 111 use protocols related to 5G NR. The TPs 111a may perform similar functions as TPs 111 in gNBs 110-1 and 110-2, and accordingly, TPs 111 and 111a may be collectively referred to herein as TPs 111.

The location management functionality in the NG-RAN 135, i.e., LSS 117, may have comparable capability to a 5GCN LMF, e.g., LMF 120. An operator could restrict an LSS 117 to support scheduling of e.g., NR Radio Access Technology (RAT) dependent positioning. The LSS 117, if present, may communicate with a gNB Central Unit (gNB-CU) and may support position determination and reporting. The LMF 120 may manage the scheduling for one or more Transmission Points (TPs) 111 that are configured to transmit downlink (DL) reference signals (RSs) to be measured by the UE 102 and one or more Reception Points (RPs) 113 that are configured to receive and measure uplink (UL) Resource Signals (RSs) transmitted by the UE 102, as well as the UL transmissions by the UE 102.

The LMF 120, SLP 129, and the LSS 117 (or LMC) in a gNB 110 may perform various functions. For example, the LMF 120 (or SLP 129) may request location measurements from the UE 102, e.g., using RRC or LPP, and may manage UL location measurements by the gNB 110 or TRP 112 of the UE 102, and may manage static and dynamic scheduling of DL-PRS and broadcast of assistance data by the gNB 110. The LMF 120 (or SLP 129) may further interact with other gNBs 110 to coordinate location support (e.g. obtain UL location measurements for a UE 102 or request changes to DL-PRS broadcast). The LSS 117 may receive the location measurements and may determine a location estimate for a UE 102. The above functions are provided as examples only. Additional or different functions may be performed if desired. An LSS 117 may communicate with other gNBs 110 using XnAP or a location specific protocol above XnAP in order to coordinate support of these functions.

Thus, an LSS 117 may support NG-RAN 135 determination of a UE 102 location which can be requested by the UE 102 (e.g., using LPP), by a serving AMF 115 (e.g., using NGAP or a location specific protocol conveyed by NGAP), by another gNB 110/ng-eNB 114 (e.g. using XnAP or a location specific protocol conveyed by XnAP), or the LMF 120 (e.g., using NRPPA protocol). Such a capability would allow location support with reduced latency in position determination (since the NG-RAN 135 is closer to a UE 102 than an LMF 120) and offload location support from LMFs.

The signaling between an AMF 115 and NG-RAN 135 node may use a protocol layering as defined in 3GPP Technical Specification (TS) 38.300 and 3GPP TS 23.501 and can make use of the Next Generation Application Protocol (NGAP) at the top level as defined in 3GPP TS 38.413. The NG-RAN 135 location reporting procedure for 3GPP Release 15 is defined in 3GPP TS 23.502 and 3GPP TS 38.413 and enables a serving AMF to request a serving NG-RAN node to report the UE location once only, periodically on a change of serving cell or periodically when a UE presence in an area of interest has changed. The location provided by the serving NG-RAN node comprises an NR or LTE Cell Global Identity CGI (CGI) and a Tracking Area Identity. The procedure may further include an optional Quality of Service (QoS) parameter in a Location Reporting Control message to enable a serving AMF 115 to request a more accurate location for a UE 102 than that corresponding to a CGI. The procedure may further include an optional list of supported Geographic Area Description (GAD) shapes in a Location Reporting Control message. The procedure may further include allowing the serving NG-RAN node to obtain a more accurate UE location when a QoS (e.g. using Enhanced Cell ID (ECID) positioning). The procedure may further permit an NG-RAN node (e.g. a gNB 110) to return a UE location to a serving AMF 115 using a GAD shape when requested in a Location Reporting Control message.

Figure 2:
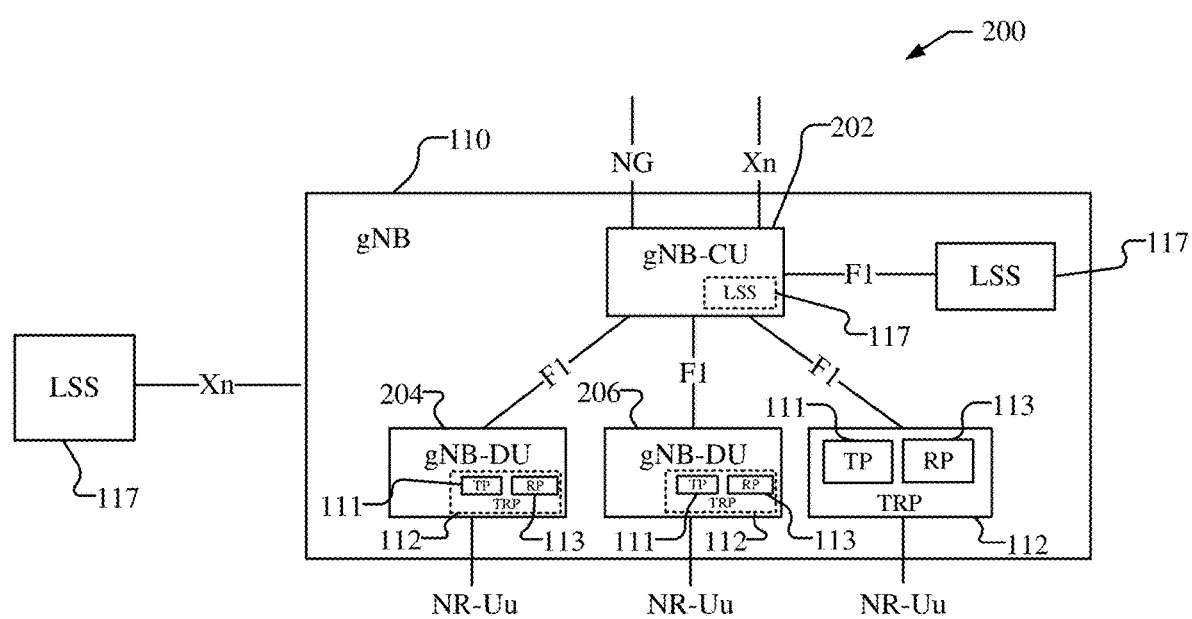
FIG. 2 shows an architecture diagram of an NG-RAN node.

FIG. 2 shows an architecture diagram of an NG-RAN node 200, which may include an LSS 117 or may be coupled to an LSS 117 that is within the NG-RAN, e.g., as a separate entity or as part of another gNB. The NG-RAN node 200 may be a gNB 110, according to one implementation. The architecture shown in FIG. 2, for example, may be applicable to any gNB 110-1 and 110-2 in NG-RAN 135 shown in FIG. 1.

As illustrated, gNB 110 includes a gNB Central Unit (gNB-CU) 202, and gNB Distributed Units (gNB-DUs) 204 and 206, which may be physically co-located in the gNB 110 or may be physically separate. The gNB-CU 202 is a logical or physical node hosting support for RRC, SDAP and PDCP protocols of the gNB used over the NR Uu air interface and controlling the operation of one or more gNB-DUs. The gNB-CU terminates the F1 interface connected with the gNB-DU. As illustrated, the gNB-CU 202 may communicate with an AMF 115 via an NG interface. The gNB-CU 202 may further communicate with one or more other gNBs 110 via the Xn interface. The gNB-DUs 204 and 206 are logical or physical nodes hosting support for RLC, MAC and PHY protocol layers used over the NR Uu air interface of the gNB 110, operation of which is partly controlled by gNB-CU 202. The gNB-DU terminates the F1 interface connected with the gNB-CU. The gNB-CU 202 requests positioning measurements (e.g. E-CID) to the gNB-DU 204 and 206. The gNB-DU 204 and 206 reports the measurements back to the gNB-CU 202. A gNB-DU 204 or 206 may include positioning measurement functionality. It should be understood that a separate measurement node is not precluded.

The LSS 117 can be part of a gNB-CU 202 (e.g. a logical function of a gNB-CU 202). However, in order to offload positioning support from a gNB-CU 202 and to allow a multi-vendor environment, a separate LSS 117 is allowed, which may be connected to the gNB-CU 202 via an F1 interface. Additionally or alternatively, an LSS 117 within the NG-RAN 135 may be external to the gNB 110, e.g., as part of another gNB, and may be connected to the gNB 110 via an Xn interface. The gNB-CU 202 can then forward all positioning related signaling to the LSS 117 and/or gNB-DUs 204 and 206 or TRPs 112.

Additionally, as illustrated, gNB 110 may include a TP 111 and an RP 113 combined into a TRP 112, and LSS 117, which may be physically or logically located in the gNB 110. The gNB-CU 202 may be configured to communicate with the TP 111, RP 113, and LSS 117, e.g., via F1 interfaces. The gNB-CU 202, thus, controls one or more TP 111 and RP 113 and the LSS 117 is accessible from the gNB-CU 202 via an F1 interface.

In some embodiments, the NG-RAN node 200 (or gNB 110) may comprise a subset of the elements shown in FIG. 2. For example, the NG RAN node 200 may comprise the gNB-CU 202 and the LSS 117 but may not include one or more of gNB-DUs 204 and 206, RP 113 or TP 111. Alternatively, NG-RAN node 200 may include one or more of gNB-DUs 204 and 206, RP 113 or TP 111 but may not include LSS 117. Further, the elements shown in FIG. 2 may be logically separate but physically co-located or may be partially or completely physically separate. For example, LSS 117 may be physically separate from gNB-CU 202 or may be physically combined with gNB-CU 202. Similarly, one or more of gNB-DUs 204 and 206, RP 113 or TP 111 may be physically separate from gNB-CU 202 or may be physically combined with gNB-CU 202. In the case of physical separation, the F1 interface may define signaling over a physical link or connection between two separated elements. In some implementations, gNB-CU 202 may be split into a control plane portion (referred to as a CU-CP or gNB-CU-CP and a user plane portion (referred to as CU-UP or gNB-CU-UP). In this case, both the gNB-CU-CP and gNB-CU-UP may interact with gNB-DUs 204 and 206 to support NR Uu air interface signaling for control plane and user plane, respectively. However, only the gNB-CU-CP may interact with LSS 117, TPs 111 and RPs 113 to support and control location related communication.

Protocol layering between the gNB-CU 202 and the TP 111, RP 113, and LSS 117 may be based on F1 C as defined in 3GPP TS 38.470, which uses F1AP at the top level as specified in 3GPP TS 38.473. New messages to support positioning could be added directly into F1AP or could be introduced in a new location specific protocol which is transported using F1AP.

The location procedures between the gNB-CU 202 and LSS 117 may comprise all location related procedures on NG, Xn, and NR-Uu interfaces. For example, the location procedures between AMF 115 and the NG-RAN node 200 may use NGAP. The location procedures between NG-RAN node 200 and other NG-RAN nodes, e.g., gNBs 110, may use XnAP or a protocol above XnAP, such as an extended NR Positioning Protocol A (NRPPa) as defined in 3GPP TS 39.455. The location procedures between NG-RAN node 200 and UE 102 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

The above support may also be realized with a single F1AP UL/DL LSS Message Transfer container and/or a new location protocol transported using F1AP. Thus, a gNB-CU 202 could forward any location related transfer messages received on NG, Xn and Uu interfaces to the LSS 117 (either within the same gNB 110 (e.g. in case the gNB includes an LSS, as illustrated in FIG. 2) or to another gNB (e.g. in case the gNB has no LSS)).

The location procedures between the LSS 117 and the gNB-DUs 204 and 206, TP 111, and RP 113, which may be coordinated by a gNB-CU 202, may include the transfer of UL/DL PRS configuration and the transfer of UL/DL PRS measurement information. The above functionality may be similar to that of LTE LMUs as specified in 3GPP TS 36.305 and TS 36.459 (SLmAP) and also similar to that between LMF 120 and NG-RAN node 200. Therefore, NRPPa could be extended to support TRP location measurement/configuration messages which can be carried inside F1AP transport messages.

Thus, the NG-RAN node 200 may support signaling and location procedures between a gNB-CU 202 and LSS 117 based on F1AP to support the same location procedures as supported on NG, Xn, and NR-Uu interfaces and, in addition, support transfer of a UL/DL PRS configuration and measurements information to/from a gNB-DU/TRP from/to the LSS.

As can be seen, the NG-RAN location functionality (LSS) may be realized using existing interfaces and protocols. However, given that there are common location procedures on Xn, NG and F1, it would be efficient to define a new generic RAN location protocol which could be transported by Xn-C or F1-C (and probably NG) transfer messages. Given that most functionality would also be required between LMF and NG-RAN Node (i.e., to support new Rel-16 location methods and features by a 5GC LMF), it may also be possible to extend NRPPa to support the additional RAN location messages.

As discussed above, 5G NR has multiple different positioning techniques available for determining the location of a UE, including DL based techniques, UL based techniques, and combined DL and UL based techniques. Downlink (DL) based techniques, for example, include DL-TDOA and DL-AoD. Uplink (UL) based techniques, for example, include UL-TDOA and UL-AoA. Combined DL and UL based techniques, for example, include RTT and multi-cell RTT (also referred to as multi-RTT). Downlink positioning techniques typically use downlink reference signals transmitted from one or more base stations, such as downlink positioning reference signals (PRS). In some implementations, other types of downlink reference signals may be used for positioning, such as navigation reference signals (NRS), tracking reference signals (TRS), cell-specific reference signals (CRS), channel state information reference signals (CSI-RS), primary synchronization signals (PSS), secondary synchronization signals (SSS), etc. Uplink positioning techniques use reference signals transmitted by the UE, such as sounding reference signals (SRS), which are sometimes referred to as SRS for positioning, or UL SRS.

Even when there is no traffic being transmitted from the network to a UE 102, the UE 102 may be expected to monitor every downlink subframe on the physical downlink control channel (PDCCH). This would mean that the UE 102 has to be "on," or active, all the time, even when there is no traffic, since the UE 102 does not know exactly when the network will transmit data for it. However, being active all the time is a significant power drain for a UE.

To address this issue, a UE 102 may implement discontinuous reception (DRX) and/or connected-mode discontinuous reception (CDRX) techniques. DRX and CDRX are mechanisms in which a UE 102 goes into a "sleep" mode for a certain periods of time and "wakes up" for other periods of time. During the wake, or active, periods, the UE 102 checks to see if there is any data coming from the network, and if there is not, goes back into sleep mode.

To further improve power savings, wake up signaling (WUS) has been introduced in 5G NR. A WUS signal is sent to a UE 102 by a serving gNB 110 to indicate to the UE 102 whether the UE 102 needs to wake up for an upcoming ON duration with CDRX configured. For example, the UE 102 may wake up sometime before the actual ON duration to decode the network WUS signaling to determine if there is an indication that the UE 102 needs to be awake during an upcoming ON duration. If the WUS does not indicate that the UE 102 needs to wake up for the next ON duration, the UE 102 may skip the complete ON cycle and wake up again later to decode a WUS indication in the next monitoring occasion. Additionally, using WUS, one or more SCells of the UE 102 may be configured for dormancy, and may be put in and out of a "dormancy" state dynamically, e.g., using the downlink control information (DCI) indication defined in DCI 2_6.

During the dormancy state, the UE 102 is not allowed to transmit SRS to the dormant SCell or perform any other UL procedure (except CSI reporting and beam management). Moreover, while measuring DL PRS transmitted by a dormant SCell is permitted, it is non-optimal.

Currently, during a positioning session, a location server, such as LMF 120, is unaware of the WUS configuration for the UE 102. Accordingly, positioning assistance data is generated by the location server and sent to the UE 102 independently of the WUS configuration resulting into non-optimal operation and increased power consumption of the UE 102. Moreover, the dormancy state or configuration for the SCells for the UE 102 is not known to the location server and accordingly the restriction of the UE 102 not being able to send UL SRS to an SCell in dormancy may introduce ambiguity in SRS detection and introduce position uncertainty.

To address the power drain caused by being on "on" or active, all the time to monitor every downlink subframe on the PDCCH, DRX and CDRX may be used to place the UE 102 in a "sleep" mode for a certain periods of time and to wake up for other periods of time. During the wake, or active, periods, the UE 102 checks to see if there is any data coming from the network, and if there is not, goes back into sleep mode.

To implement DRX and CDRX, the UE 102 and the base stations 110 need to be synchronized. In a worst case scenario, the base stations 110 may attempt to send some data to the UE 102 when it is in sleep mode, and the UE 102 may wake up when there is no data to be received. To prevent such scenarios, the UE 102 and the base stations 110 should have a well-defined agreement about when the UE 102 can be in sleep mode and when the UE 102 should be awake/active. This agreement is defined, e.g., in 3GPP Technical Specification (TS) 36.321 Section 5.7 for UEs in connected mode (CDRX), and 3GPP TS 36.304 Section 7.1 for UEs in idle mode (DRX). Note that DRX includes CDRX, and thus, references to DRX refer to both DRX and CDRX, unless otherwise indicated.

The base stations 110 (e.g., serving cell 110-1) can configure the UE 102 with the DRX/CDRX timing using an RRC Connection Reconfiguration message (for CDRX) or an RRC Connection Setup message (for DRX). The base station 110-1 can signal the following DRX configuration parameters to the UE 102:

TABLE 1

| DRX Parameter | Description |
| --- | --- |
| DRX Cycle | The duration of one 'ON time' plus one 'OFF time'. (This value is not explicitly specified in RRC messages. This is calculated by the subframe time and "long DRX cycle start offset") |
| ON Duration Timer | The duration of 'ON time' within one DRX cycle |
| DRX Inactivity Timer | Specifies how long a UE should remain 'ON' after the reception of a PDCCH. When this timer is on, the UE remains in the 'ON state,' which may extend the ON period into the period that would be the 'OFF' period otherwise. |
| DRX Retransmission Timer | Specifies the maximum number of consecutive PDCCH subframes the UE should remain active to wait for an incoming retransmission after the first available retransmission time |
| Short DRX Cycle | DRX cycle that can be implemented within the 'OFF' period of a long DRX Cycle |
| DRX Short Cycle Timer | The consecutive number of subframes the UE shall follow the short DRX cycle after the DRX inactivity timer has expired |

Figure 3A:
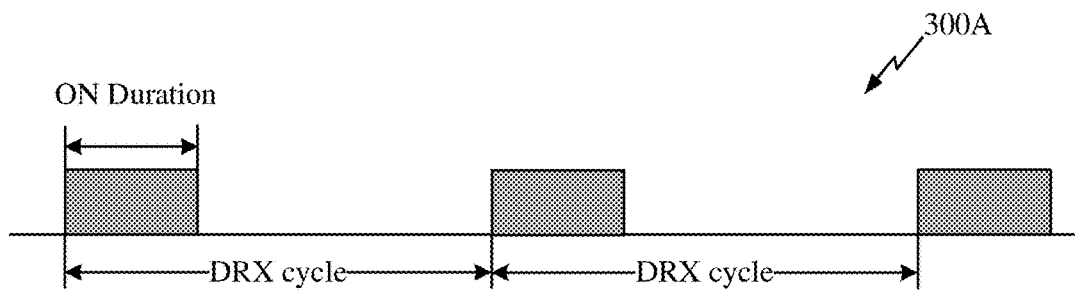
FIGS. 3A to 3C illustrate exemplary discontinuous reception (DRX) configurations.
Figure 3B:
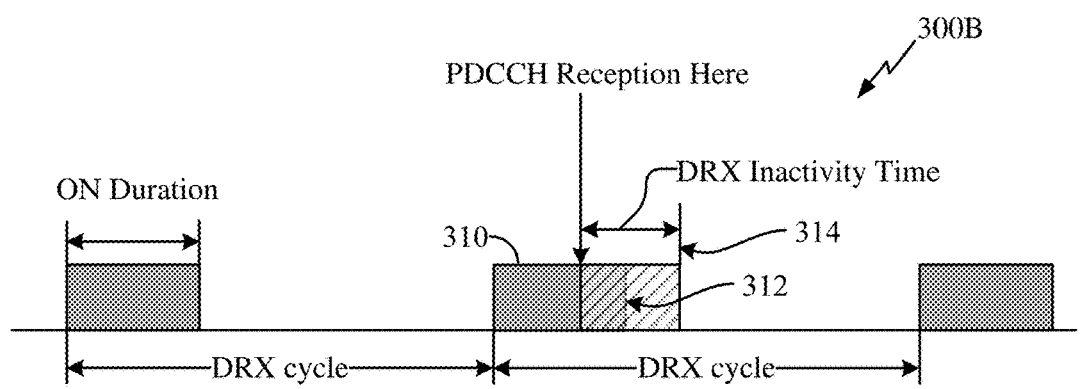
Figure 3C:
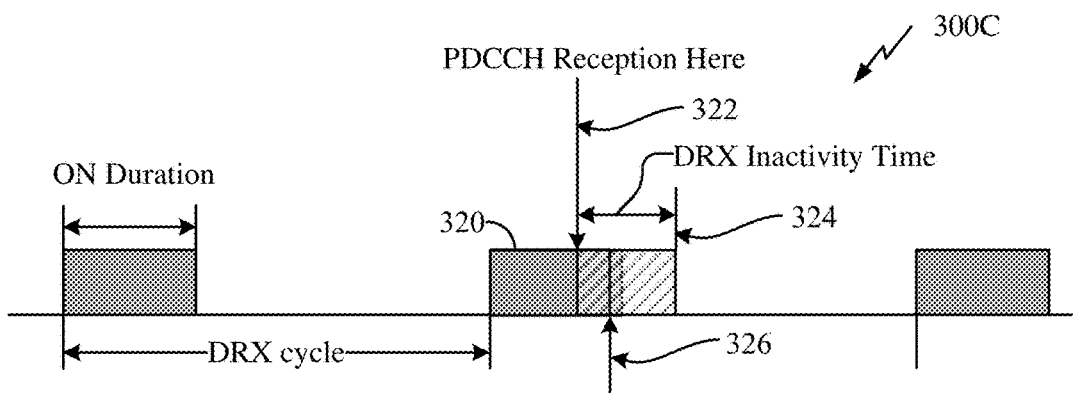

FIGS. 3A to 3C illustrate exemplary DRX configurations, according to some implementations. FIG. 3A illustrates an exemplary DRX configuration 300A in which a long DRX cycle (the time from the start of one ON duration to the start of the next ON duration) is configured and no PDCCH is received during the cycle. FIG. 3B illustrates an exemplary DRX configuration 300B in which a long DRX cycle is configured and a PDCCH is received during an ON duration 310 of the second DRX cycle illustrated. Note that the ON duration 310 ends at time 312. However, the time that the UE is awake/active (the "active time") is extended to time 314 based on the length of the DRX inactivity timer and the time at which the PDCCH is received. Specifically, when the PDDCH is received, the UE starts the DRX inactivity timer and stays in the active state until the expiration of that timer (which is reset each time a PDDCH is received during the active time).

FIG. 3C illustrates an exemplary DRX configuration 300C in which a long DRX cycle is configured and a PDCCH and a DRX command MAC control element (CE) are received during an ON duration 320 of the second DRX cycle illustrated. Note that the active time beginning during ON duration 320 would normally end at time 324 due to the reception of the PDCCH at time 322 and the subsequent expiration of the DRX inactivity timer at time 324, as discussed above with reference to FIG. 3B. However, in the example of FIG. 3C, the active time is shortened to time 326 based on the time at which the DRX command MAC CE, which instructs the UE to terminate the DRX inactivity timer and the ON duration timer, is received.

In greater detail, the active time of a DRX cycle is the time during which the UE 102 is considered to be monitoring the PDCCH. The active time may include the time during which the ON duration timer is running, the DRC inactivity timer is running, the DRX retransmission timer is running, the MAC contention resolution timer is running, a scheduling request has been sent on the physical uplink control channel (PUCCH) and is pending, an uplink grant for a pending hybrid automatic repeat request (HARQ) retransmission can occur and there is data in the corresponding HARQ buffer, a PDCCH indicating a new transmission addressed to the cell radio network temporary identifier (C-RNTI) of the UE 102 has not been received after successful reception of a random access response (RAR) for the preamble not selected by the UE 102, and in the non-contention based random access (RA), after receiving the RAR, the UE 102 should be in an active state until the PDCCH indicating new transmission addressed to the C-RNTI of the UE 102 is received.

In some aspects, the base station 110 may configure the UE 102 to perform DRX operation, such as connected mode DRX operation (e.g., DRX operation while the UE 102 is in a connected mode with the base station 110), idle mode DRX operation (e.g., DRX operation while the UE 102 is in an idle mode), and/or the like. The DRX operation of the UE 102 may include short DRX cycle operation and long DRX cycle operation. Moreover, the UE 102 may be configured to transition between short DRX cycle operation and long DRX cycle operation.

The base station 110 may transmit to the UE 102, a WUS monitoring configuration to configure the UE 102 for WUS monitoring for short DRX cycle operation and long DRX cycle operation. In some aspects, the WUS monitoring configuration may be transmitted to the UE 102 during a random access channel (RACH) procedure between the UE 102 and the base station 110, prior to the UE 102 and the base station 110 establishing a connection, after the UE 102 and the base station 110 establish a connection, and/or the like. In some aspects, the WUS configuration may be included in a radio resource control (RRC) communication, a medium access control (MAC) control element (MAC-CE) communication, a downlink control information (DCI) communication, system information (e.g., a system information block (SIB), other system information (OSI), remaining minimum system information (RMSI), a synchronization signal block (SSB), and/or the like), and/or the like.

In some aspects, the WUS monitoring configuration may include one or more first WUS monitoring parameters for monitoring for a WUS during short DRX cycle operation of the UE 102 and may include one or more second WUS monitoring parameters for monitoring for a WUS during long DRX cycle operation of the UE 102. In some aspects, the one or more first WUS monitoring parameters may identify a WUS occasion duration for WUS occasions during short DRX cycle operation of the UE 102.

The base station 110 may transmit a WUS to the UE 102 based at least in part on the WUS monitoring configuration. For example, the base station 110 may transmit a WUS to the UE 102 based at least in part on the one or more first WUS monitoring parameters when the UE 102 is in short DRX cycle operation. As another example, the base station 110 may transmit a WUS to the UE 102 based at least in part on the one or more second WUS monitoring parameters when the UE 102 is in long DRX cycle operation.

The UE 102 may monitor for the WUS based at least in part on the WUS monitoring configuration. For example, if the UE 102 is in short DRX cycle operation, the UE 102 may monitor for the WUS based at least in part on the one or more first WUS monitoring parameters. In this case, the UE 102 may monitor for a WUS during a WUS occasion (e.g., may start monitoring for the WUS at the beginning of a WUS occasion) and at a periodicity of WUS occasions indicated by the one or more first WUS monitoring parameters, may identify a WUS indicator and wakeup information in the WUS based at least in part on the one or more first WUS monitoring parameters, may monitor for the WUS in one or more time-domain and/or frequency-domain resources based at least in part on the one or more first WUS monitoring parameters, and/or the like.

As another example, if the UE 102 is in long DRX cycle operation, the UE 102 may monitor for the UE 102 based at least in part on the one or more second WUS monitoring parameters. In this case, the UE 102 may monitor for a WUS during a WUS occasion and at a periodicity of WUS occasions indicated by the one or more second WUS monitoring parameters, may identify a WUS indicator and wakeup information in the WUS based at least in part on the one or more second WUS monitoring parameters, may monitor for the WUS in one or more time-domain and/or frequency-domain resources based at least in part on the one or more second WUS monitoring parameters, and/or the like.

Figure 4:
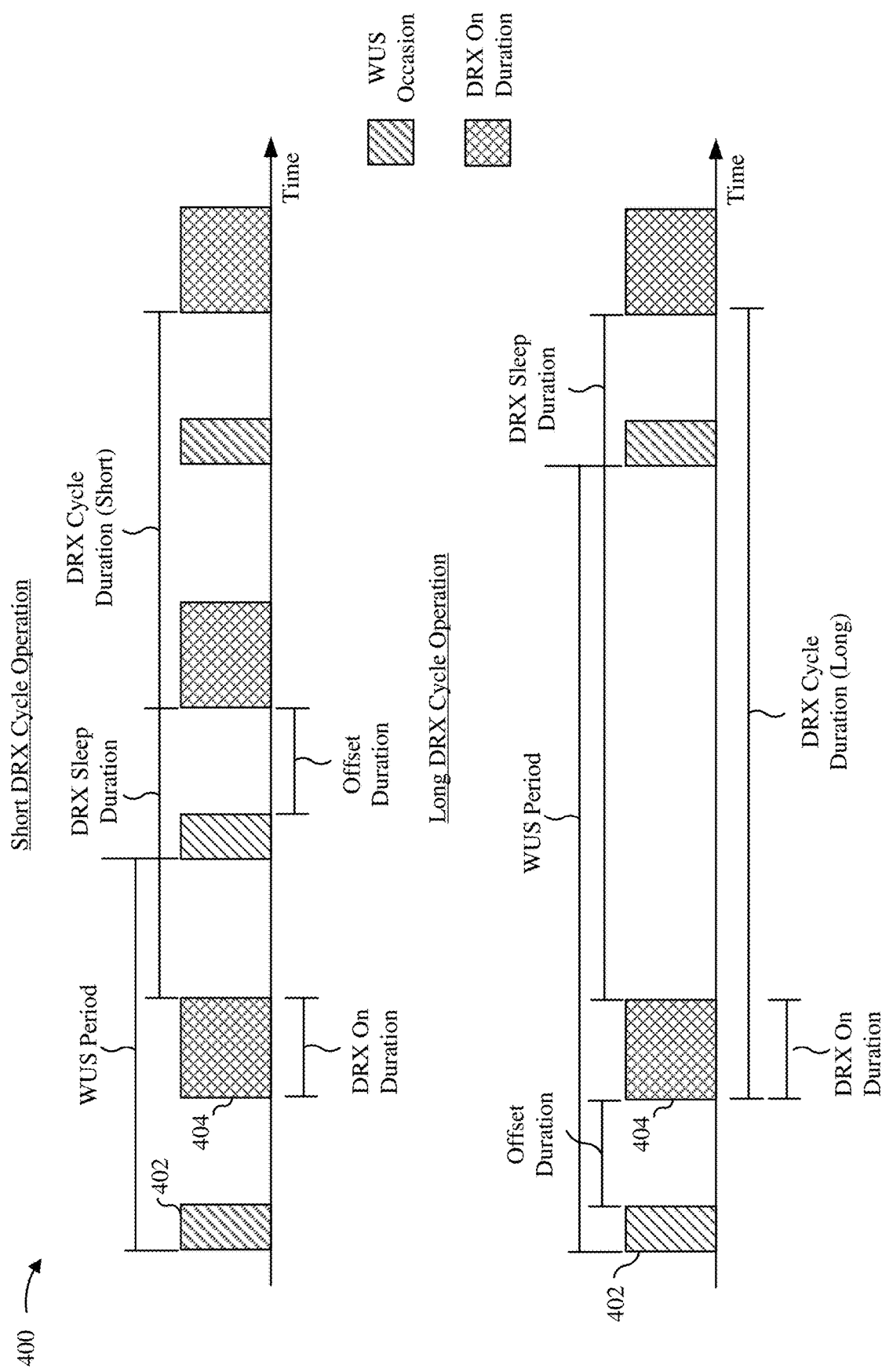
FIG. 4 illustrates examples of a wake-up signal configuration for a short DRX cycle operation and a long DRX cycle operation.

FIG. 4 illustrates examples 400 of a WUS configuration for short DRX cycle operation and a WUS configuration for long DRX cycle operation. In some aspects, the UE 102 may be configured with other WUS configurations, other short DRX cycle operation configurations, other long DRX cycle operation configurations, and/or the like.

As shown in FIG. 4, the periodicity of WUS occasions 402 for short DRX cycle operation may be shorter than the periodicity of WUS occasions for long DRX cycle operation, such that short DRX cycle operation includes a greater quantity of WUS occasions relative to long DRX cycle operation to accommodate for the greater quantity of DRX on durations 404 of short DRX cycle operation. In some aspects, other WUS monitoring parameters of short DRX cycle operation and long DRX cycle operation may be different, such as the WUS occasion duration of WUS occasions, the offset duration between WUS occasions and DRX on durations, time-domain resources and/or frequency-domain resources allocated to the WUS occasions, and/or other WUS monitoring parameters.

While the DRX cycles illustrated in FIG. 4 show a DRX on duration followed by a DRX sleep duration, the DRX cycles may alternatively include a DRX sleep duration followed by a DRX on duration.

In this way, the base station 110 may transmit a WUS monitoring configuration to the UE 102. The WUS monitoring configuration may identify one or more first WUS monitoring parameters associated with short DRX cycle operation of the UE 102 and one or more second WUS monitoring parameters associated with long DRX cycle operation of the UE 102. The UE 102 may monitor for a WUS during short DRX cycle operation based at least in part on the one or more first WUS monitoring parameters, and may monitor for a WUS during long DRX cycle operation based at least in part on the one or more second WUS monitoring parameters. In this way, the WUS monitoring configuration may configure WUS occasions for the UE 102 such that WUS occasions occur at a particular offset duration prior to an associated DRX on duration, regardless of whether the UE 102 is in short DRX cycle operation or long DRX cycle operation.

Figure 5:
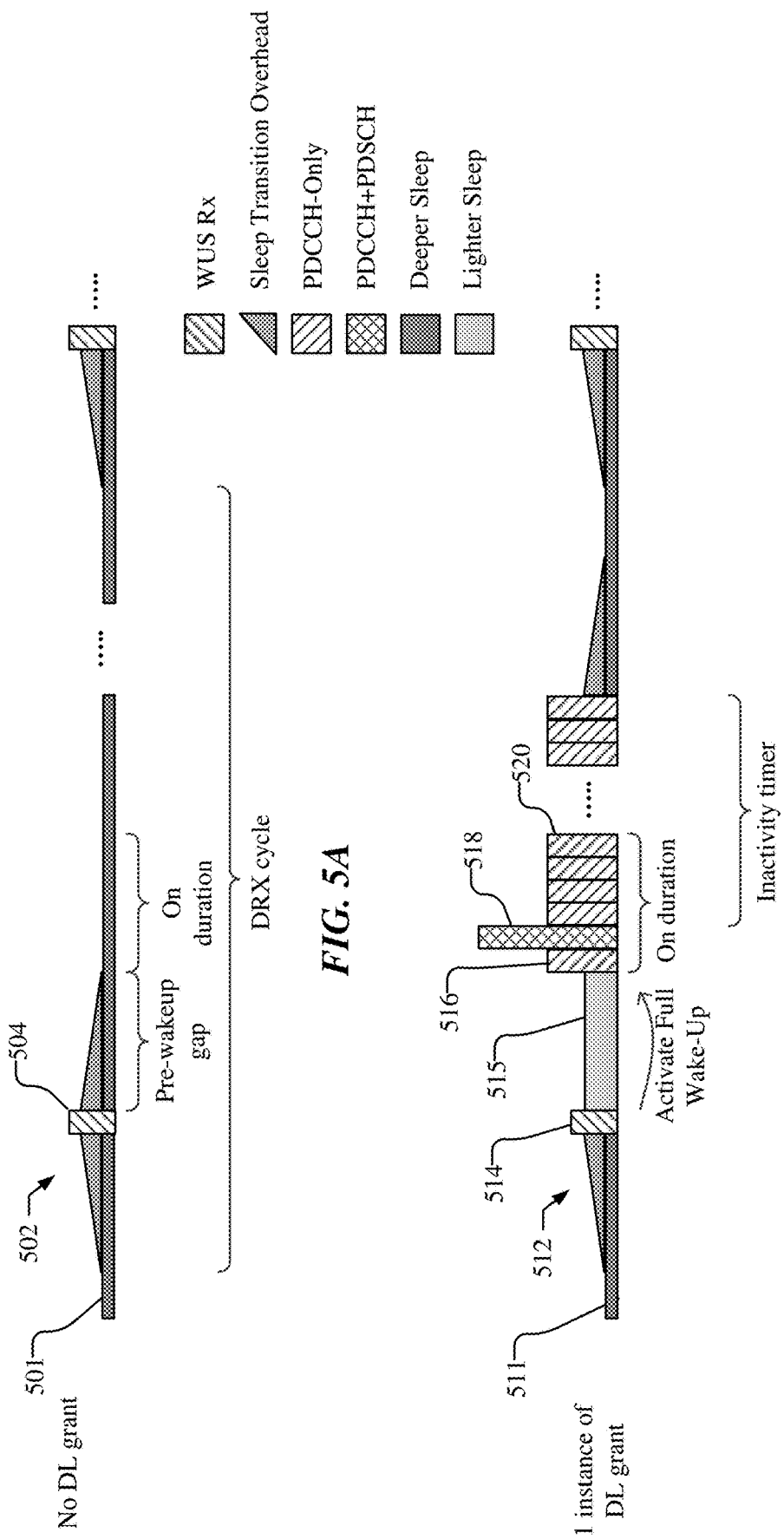
FIGS. 5a and 5b illustrate examples of a physical downlink control channel (PDCCH)-based wake-up signal with no downlink (DL) grant and with one instance of DL grant.

FIGS. 5A and 5B respectively illustrate an example 500 of a PDCCH-based WUS, where there is no DL grant (i.e., WUS indicates UE 102 is to remain in inactive mode) and an example 550 a PDCCH-based WUS, where there is an instance of a DL grant (i.e., WUS indicates that the UE 102 is to wake-up at the next ON mode of the DRX cycle), where the x axis represents time and the y axis is proportional to the power consumption level of the UE 102.

In FIG. 5A, for example, the UE 102 is in DRX mode 501 illustrated as a deeper sleep and transitions to a lighter sleep for a WUS monitoring occasion 502 during which a WUS 504 is received. The WUS 504, in this instance indicates that the UE 102 is not to wake up during the ON duration of the next DRX cycle. Consequently, as illustrated, UE 102 may transition back to a deeper sleep and remain inactive during the ON duration of the next DRX cycle, which occurs after a pre-wakeup gap duration.

In FIG. 5B the UE 102 is also in DRX mode 511 illustrated as a deeper sleep transitions to a lighter sleep for a WUS monitoring occasion 512 during which a WUS 514 is received. The WUS 514 in FIG. 5B, however, indicates that the UE 102 is to awaken at the ON duration of the next DRX cycle. Thus, after the pre-wakeup gap 515 after detecting WUS 514, the UE 102 becomes active and detects, e.g., downlink control information (DCI) 516 and PDCCH 518. The UE 102 remains on as indicated by bars 520 after reception of the PDCCH 518 for the length of the inactivity timer. In this instance, the ON period is extended into the period that the UE 102 would otherwise be OFF due to the inactivity timer. At the expiration of the inactivity timer, the UE 102 transitions to an inactive state and the process continues.

The two-stage wake-up facilitates low power implementation for PDCCH-WUS detection, because during the first stage wake-up, several optimizations are possible. For example, a minimal set of hardware is required to be brought online for PDCCH-only processing. Further, the operating point in terms of the voltage levels and clock frequencies of the hardware is reduced. The PDCCH processing timeline is relaxed due to the WUS offset, i.e., pre-wakeup gap, enabling (e.g. offline processing). Moreover, the reception bandwidth, the number of candidates and/or aggregation levels for PDCCH-WUS may potentially be reduced.

A WUS may be a bit in a WUS DCI that is assigned to a particular UE 102. For example, if the bit is, e.g., a "1" it indicates that the UE 102 is to monitor the next (i.e., upcoming) ON duration, while a "0" indicates that the UE 102 is not to monitor the next ON duration and may remain in inactive or sleep mode. If the WUS indicates that the UE 102 is to wake-up, the UE 102 starts the ON Duration Timer for the next single occurrence, and otherwise the ON Duration Timer does not start.

Several power saving channel principles apply to a WUS. For example, the WUS is configured to be transmitted to a UE by a primary base station, e.g., from the primary cell (PCell) or primary secondary cell (PSCell) only. More than one WUS monitoring occasion per DRX cycle may be configured within one or multiple slots. The WUS does not impact the BWP Inactivity Timer, the data Inactivity Timer, or the SCell Deactivation Timer. The UE is not expected to monitor WUS during DRX Active Time. If the current active BWP during DRX operation does not have a WUS configuration, or the WUS monitoring occasion is invalid, the UE starts DRX ON Duration Timer for the next ON occurrence. When WUS is not detected, for example, due to discontinuous transmission (DTX) from the base station 110 or misdetection at the UE 102, the UE 102 behavior, e.g., whether to start or not to start the DRX ON Duration Timer for the next occurrence, is configurable. Further, if both Short and Long DRX cycles are configured, WUS is applied only for Long DRX cycles.

The WUS may be provided in DCI format, such as DCI format 2-6, which is a group common, but may contain UE-specific information fields. The payload size for the DCI format, for example, may be optimized from a minimum of 12-bit payload. The WUS supports carrier aggregation and SCell dormancy indication. For example, the WUS is transmitted by the primary cell and may apply across one or more SCells. The WUS, for example, may carry a dormancy indication for groups of SCells, if configured. The WUS occasion configuration may be further optimized, e.g., for a short "window" for WUS monitoring thereby minimizing power consumption. Additionally, WUS may be configured to reduce aggregation levels and candidates, etc.

Figure 6:
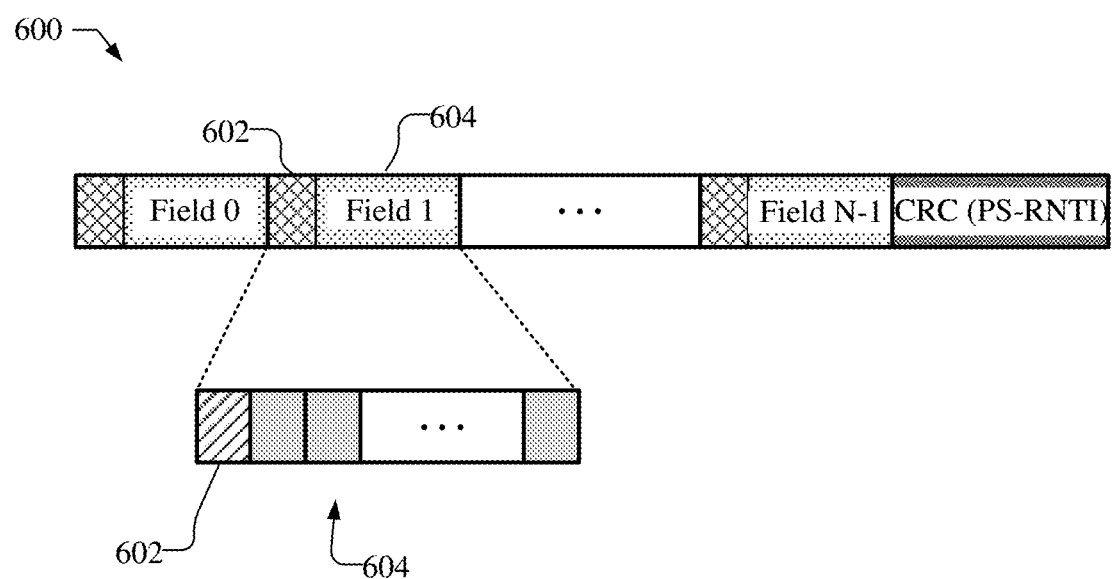
FIG. 6 illustrates an example of a format for a downlink control information (DCI) communication including a wake-up signal indicator.

FIG. 6 illustrates an example of a DCI format 600 for WUS. The DCI format may be defined for monitoring WUS. The DCI format 600 may support multiplexing of one or more UEs and is monitored only in common search space (CSS), such as Type-3 CSS. The DCI format 600 may follow PDCCH and DCI rules with a minimum payload size of 12 bit, plus 24-bit cyclic redundancy check (CRC). The DCI format 600 is similar to UE-specific configuration DCI format 2-6. Once a DCI format 2_6 is detected on a WUS monitoring occasion, the UE will find an assigned field within the DCI, such as a field 604 a UE-specific field 602 starts with 1-bit wake-up indicator, immediately followed by a content field 604 with a bitmap for SCell dormancy indication, which may have a variable size, e.g., 0-5 bits. The indicated UE behavior, for example, is illustrated in Table 2.

TABLE 2

| | Indicated UE Behavior | |
|---|---|---|
| | 0 | 1 |
| Wake-Up Indication Bit | Do not start drx-onDurationTimer for the next DRX cycle | Start drx-onDurationTimer for the next DRX cycle |
| Bitmap for SCell Dormancy Indication | For each activated SCell in the corresponding SCell Group: If the current active BWP is a non-dormant BWP, it switches to the dormant-BWP | For each activated SCell in the corresponding SCell Group: If the current active BWP is a non-dormant BWP, it continues with the same BWP |

TABLE 2-continued

| Indicated UE Behavior | |
|---|---|
| 0 | 1 |
| If the current active BWP is the dormant BWP, it continues with the dormant BWP | If the current active BWP is the dormant BWP, it switches to a specific non-dormant BWP configured by RRC |

While an SCell is in the dormancy state, the UE 102 is not permitted to transmit SRS or perform other UL procedures, except CSI reporting and beam management. Further, measuring DL PRS transmitted by SCells is non-optimal as it will require increased power consumption to monitor for the transmissions.

The location server, such as LMF 120, is conventionally unaware of the WUS configuration and the SCells configured for dormancy. Accordingly, the positioning assistance data prepared for the UE 102 by the location server during a positioning session is independent of the WUS configuration and may non-optimal DL PRS from dormant SCells. The location server may further request UL SRS (SRS for positioning) transmission from the UE 102 and detection by SCells that is not possible due to the dormant state.

In one option, the location server, such as LMF 120, may receive the dormancy configuration for SCells serving the UE 102. The dormancy configuration, for example, may be provided as the SCELL list configured for dormancy in the initial RRC configuration for the UE 102. In one implementation, the dormancy configuration may be provided to the location server by the UE 102, e.g., as part of the initial capability signaling during the positioning session. In another implementation, the location server may obtain the dormancy configuration information from the serving base station, e.g., over NRPPa.

Once the location server has obtained the dormancy configuration for SCells, the location server may take various actions so that the PDDCH WUS configuration, e.g., field 602 shown in FIG. 6, and the selected dormancy of SCells, e.g. in field 604, does not affect the positioning session. For example, in one implementation, the location server may configure the assistance data for positioning and the scheduled UL SRS for positioning for SCells that are not configured for dormancy. By preparing the assistance data for downlink position measurements and the scheduled SRS for uplink position measurements for SCells that are not configured for dormancy during the positioning session, the dormancy state of the SCells do not need to be altered during positioning. This approach ensures that no additional power in incurred during WUS and dormancy configuration due to positioning. However, the geometric configuration of base stations participating in the positioning session may be non-ideal due to the exclusion of SCells that are configured for dormancy.

In another implementation, the location server may send an indication to the serving base station, e.g., supporting the PCell, to remove one or more SCells from dormancy list, e.g., if the location server determines that those SCells are preferred for positioning. The location server may provide an indication of a time period, e.g., based on positioning timeout, for which the SCells should be removed from the configured dormancy. The serving base station may remove the SCells from the dormancy configuration in response to the indication from the location server. For example, the serving base station may update the WUS configuration for the UE 102, e.g., by signaling the UE 102 and the SCells with the new WUS configuration, which removes the one or more SCells from the dormancy list. After the indicated time period, the serving base station may update the WUS configuration to place the one or more SCells back on the dormancy list for the UE 102, e.g., by signaling the UE 102 and the SCells with the new WUS configuration. Thus, the dormancy state of one or more SCells may be gracefully skipped during the positioning session with the location server and serving base station awareness. The location server in this implementation may indicate uplink and downlink measurements on the desired SCells in the positioning assistance data and the UE is allowed to transmit UL SRS (SRS for positioning) to the desired SCells, which would otherwise be in dormancy.

In another option, the PDCCH WUS configuration, e.g., field 602 shown in FIG. 6, may be set to '1' to wake up the UE 102 and one or more SCells may be brought out of dormancy, e.g. in field 604, for one or more monitoring occasions during the positioning session. For example, the location server may provide an indication to the serving base station, e.g., supporting the PCell, to bring one or more SCells out of dormancy during the positioning session. In the present option, the location server may receive the dormancy configuration for SCells serving the UE 102, as discussed above, or in other implementations, may not receive the dormancy configuration for the SCells. In this example, the dormancy configuration of all the SCELLS may be maintained, i.e., there is no need to update the dormancy configuration. The location server, however, may indicate specific SCells or all of the SCells that are on the dormancy list to be brought of dormancy for all monitoring occasions during the positioning session. In response, the serving base station may set the PDCCH WUS set to '1' and bring the SCells out of dormancy for all monitoring occasions during the positioning session. The UE 102 may use the gapless or measurement gap based measurement as applicable to accumulate all the measurements for downlink measurement and send UL SRS during the positioning session. During the ON occasion, the UE 102 may perform the current DRX aware positioning.

In another option, the PDCCH WUS configuration, e.g., field 602 shown in FIG. 6, may be set to '1' to wake up the UE 102 and one or more SCells may be brought out of dormancy, e.g. in field 604, selectively by the serving base station supporting the PCell by checking the assistance data and measurement/transmission schedules for downlink and uplink PRS. The location server, for example, may indicate the UL SRS and DL PRS (or other DL reference signals) to the serving base station supporting the PCell, which is to be specified to the UE 102 for measurement (DL) and transmission (UL) during the positioning session. The location server, in this option, does not need to receive the dormancy configuration for SCells serving the UE 102. Based on the periodicity of the configured UL SRS and DL PRS, the serving base station may determine the monitoring occasions for WUS that are prior to these UL SRS and DL PRS occasions. The serving base station may bring the appropriate SCells out of dormancy at the appropriate monitoring occasions accordingly. For example, the serving base station may set the WUS bit indication (e.g., bit 602 shown in FIG. 6) to '1' for all instances where the UL SRS measurement occasion is during the ON cycle. For the UL SRS that is configured on one of the SCells in the dormancy configuration, the serving base station may indicate the 'Out of Dormancy' indication (in field 604 of FIG. 6) to the UE 102 before the upcoming DL PRS or UL SRS schedule.

Figure 7:
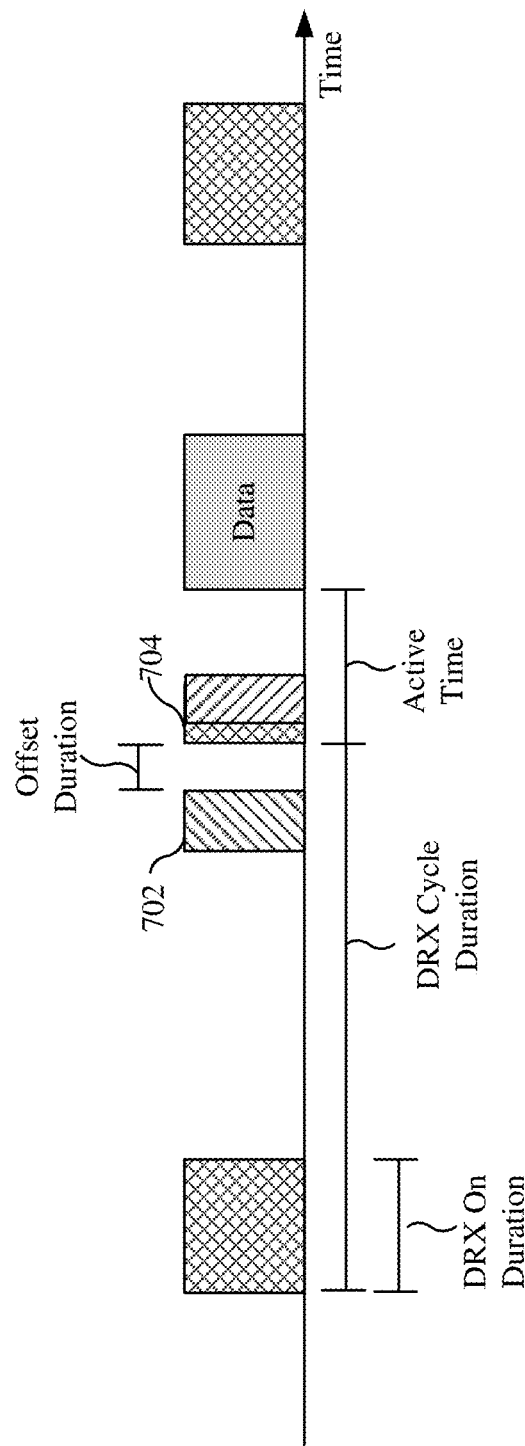
FIG. 7 illustrates an example of a wake-up signal monitoring occasion.

FIG. 7, by way of example, illustrates an example 700 of a simplified PDCCH-based WUS 702 with instances of DRX On durations 704 to illustrate the various implementations discussed herein. In one implementation discussed above, the PDCCH WUS 702 and selective dormancy on SCells does not affect the positioning session because the location server may generate assistance data and schedule UL SRS transmission and measurements to exclude SCells included in the SCell dormancy list, or may provide instructions to the serving base station supporting the PCell to update the SCell dormancy list to remove SCells to be used for positioning. In another implementation, the PDCCH WUS 702 may be set to '1' to wake up the UE 102 and to bring the SCells out of dormancy for all monitoring occasions during the positioning session. In another implementation, the PDCCH WUS 702 may be set to '1' and to bring the SCells out of dormancy by the serving base station by selectively checking the assistance data and measurement and transmission schedule of the downlink and uplink PRS.

Figure 8:
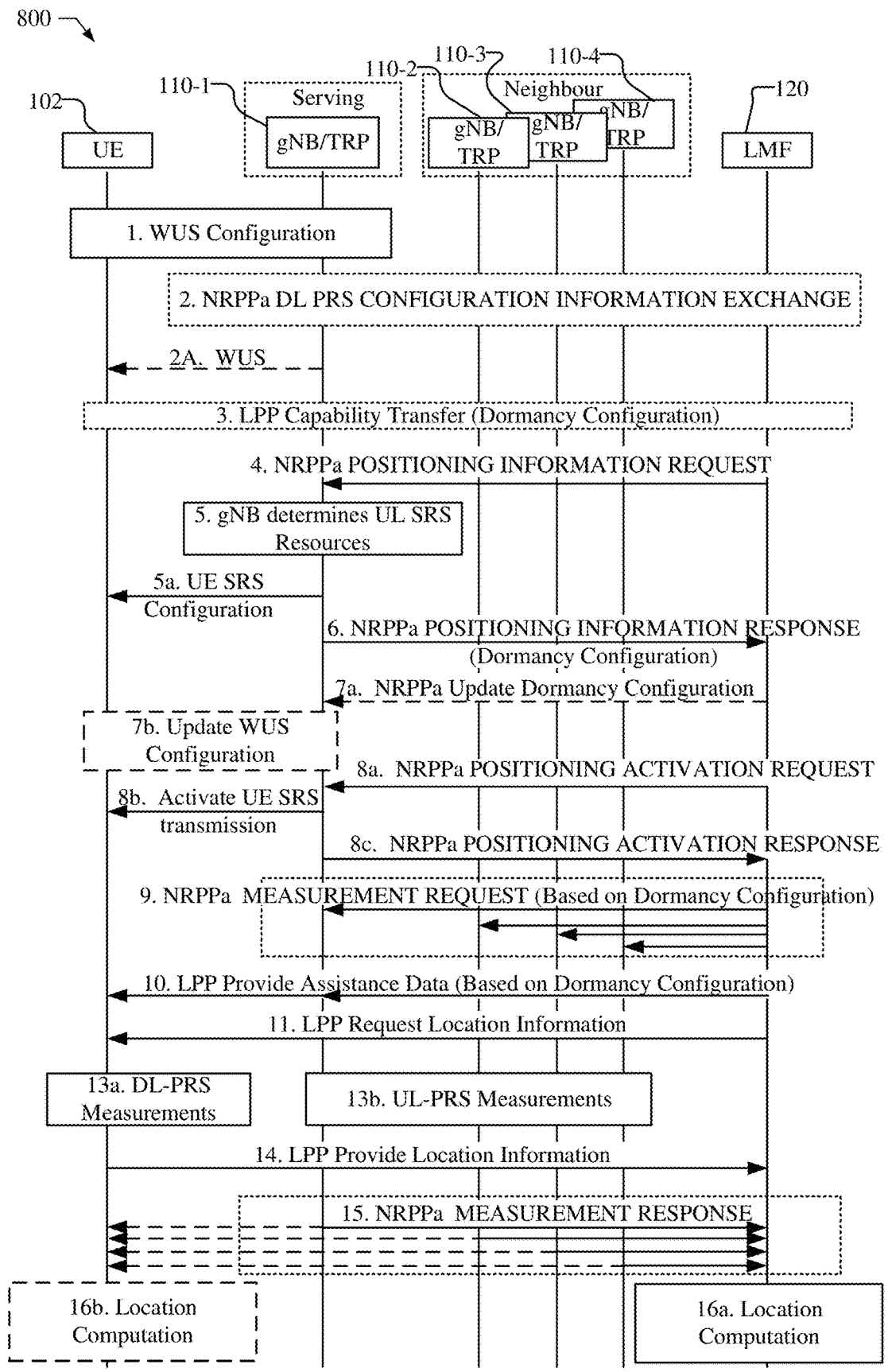
FIG. 8 is a message flow with various messages sent between components of a wireless communication system, illustrating support for positioning of a UE configured for a wake-up signal with DL PRS reception.

FIG. 8 is a message flow 800 illustrating the messaging between a location server, e.g., LMF 120, serving gNB 110-1 and neighboring gNBs 110-2, 110-3, 110-4, collectively sometimes referred to as gNBs 110. The serving gNB 110-1 may support the PCell and one or more of the neighboring gNBs 110-2, 110-3, 110-4 may support SCells. While the use of LMF 120 is illustrated in FIG. 8, it should be understood that other entities may be used in place of, or in addition to, the LMF 120 including, e.g., an SLP 129, or LSS 117 (or LMC) in the NG-RAN 135, or the UE 102. For example, the LSS 117 may be a logical function of the serving gNB 110-1 CU. In some implementations, the LSS 117 may be inside the gNB 110-1, but connected to the CU or outside the gNB 110-1. For example, if the LSS 117 is outside the gNB 110-1 or separate from the gNB 110-1 CU, additional messages (e.g. XnAP messages) may be used to transfer messages from the gNB 110-1 to the LSS 117 and back from the LSS 117 to the gNB 110-1. The positioning procedure illustrated in FIG. 8 includes both DL PRS and UL SRS for the sake of inclusiveness. The DL PRS and UL SRS measurements, for example, may be used to support a positioning method such as multi-cell RTT in which UE 102 obtains DL measurements and gNBs 110 obtain UL measurements. It should be understood, however, that the procedure illustrated in FIG. 8 may be used with other types of positioning methods that rely, e.g., on only DL PRS by excluding the stages related to UL SRS, or that rely on only UL SRS by excluding the stages related to DL PRS. Accordingly, the procedure may be used with positioning measurements, such as UL TDOA, UL AOA, DL TDOA, DL AOD, A-GNSS, WLAN, RTT, multi-cell RTT or some combination of these.

At stage 1, the UE 102 may receive a WUS configuration and a DRX configuration from the gNB 110-1, e.g., via RRC messaging.

At stage 2, the LMF 120 and gNBs 110 may use an NRPPa DL PRS configuration information exchange procedure, e.g., as described in 3GPP TS 38.305 or TS 38.455, to obtain from gNBs 110 or send to gNBs 110 DL PRS configuration information (e.g. including parameters for DL PRS transmission such as PRS frequency, bandwidth, timing, coding, muting, frequency hopping) required for a positioning method, e.g., multi-RTT positioning. The PRS configuration information can be sent as assistance data to UE 102 (at stage 10) and/or to an LSS 117 (not shown). The PRS configuration information can be used by: UE 102 to assist DL PRS measurements at stage 13*a*; LMF 120 to request UL SRS configuration information from the serving gNB 110-1 for the UE 102 at stage 4; and/or by an LSS 117 to assist calculation of the UE 102 location.

At stage 2A, the serving gNB 110-1 may send the UE 102 a WUS signal indicating that the UE 102 is to wake up during a next ON time during the DRX cycle in order to be brought back into a CONNECTED state. For example, stage 2A may be performed once or possibly more than once to enable UE 102 to receive and/or send messages at stages 3, 5*a*, 7*b*, 8*b*, 10, 11, 14 and/or 15, to measure DL PRS at stage 13*a*, and/or to transmit UL SRS at stage 13*b*, as described later. The WUS signal at stage 2A may be triggered as part of stage 3 (or as part of stage 5*a*, 7*b*, 8*b*, 10, 13*a*, 13*b*, 14 and/or 15), e.g. if the LMF 120 sends an LPP message to UE 102 as part of stage 3 via AMF 115 and gNB 110-1 and AMF 115 or gNB 110-1 determines that UE 102 is not in the CONNECTED state.

At stage 3, the LMF 120 may request the positioning capabilities of the UE 102 using a LPP Capability Transfer procedure, e.g., described in 3GPP TS 38.305 or TS 37.355, and the UE 102 may provide its positioning capabilities to the LMF 120. In some implementations, the UE 102 may provide a dormancy configuration to the LMF 120. The dormancy configuration provided to the LMF 120, for example, may indicate Scells which are and/or are not on a dormancy list, as described for FIGS. 3-7. The dormancy configuration may be used by the LMF 120 to configure assistance data and schedule UL SRS and/or DL PRS using SCells that are not on the dormancy list. In another implementation, the LMF 120 may use the dormancy configuration to determine which SCells are on the dormancy list and to provide an indication to the serving gNB 110-1 of one or more SCells that are to be used for positioning for the serving gNB 110-1 to update the dormancy configuration to remove the one or more SCells from the dormancy list or to set the WUS indication to wake up the one or more SCells for selected or all monitoring occasions during the positioning session.

At stage 4, the LMF 120 sends a NRPPa POSITIONING INFORMATION REQUEST message to the serving gNB 110-1 to request UL information for the UE 102.

At stage 5, the serving gNB 110-1 determines the resources available for UL SRS and configures the UE 102 with the UL-SRS resource sets at stage 5*a*.

At stage 6, the serving gNB 110-1 provides the UL SRS configuration information to the LMF 120 in a NRPPa POSITIONING INFORMATION RESPONSE message. In some implementations, the serving gNB 110-1 may provide a dormancy configuration to the LMF 120, e.g., if the UE 102 does not provide the dormancy configuration to the LMF 120 in stage 3. As discussed in stage 3, the dormancy configuration provided to the LMF 120, for example, may be used by the LMF 120 to configure assistance data and schedule UL SRS and/or DL PRS using SCells that are not on the dormancy list. In another implementation, the LMF 120 may use the dormancy configuration to determine which SCells are on the dormancy list and to provide an indication to the serving gNB 110-1 of one or more SCells that are to be used for positioning for the serving gNB 110-1 to update the dormancy configuration to remove the one or more SCells from the dormancy list or to set the WUS indication to wake up the one or more SCells for selected or all monitoring occasions during the positioning session.

At stage 7a, the LMF 120 may optionally provide an indication to the serving gNB 110-1 to update the dormancy configuration to remove one or more SCells, which may be used for positioning measurements, from the dormancy list received from the UE 102 at stage 3 or received from the serving gNB 110-1 at stage 6. At stage 7b, and if stage 7a occurs, the serving gNB 110-1 sends the UE 102 an update to the WUS configuration, e.g., via RRC messaging, to remove the one or more SCells from the dormancy list. In some implementations, the LMF 120 may indicate the estimated duration of the positioning session in stage 7a (or may send an indication to the serving base station 110-1 after the positioning session has ended), and at the expiration of the estimated duration received from the LMF 120 (or after receiving an indication from the LMF 120 that the positioning session has ended) (not shown) the serving gNB 110-1 may send the UE 102 another update to the WUS configuration, e.g., via RRC messaging, to include the one or more SCells back in the dormancy list.

At stage 8a, the LMF 120 sends an NRPPa POSITIONING ACTIVATION REQUEST, requesting UE SRS activation message to the serving gNB 110-1. In some implementations, if the dormancy configuration was not updated to remove SCells from the dormancy list, e.g., at stages 7a and 7b, the NRPPa POSITIONING ACTIVATION REQUEST may be based on the dormancy configuration provided to the LMF 120 at stages 3 or 6 and may be schedule UL SRS transmissions from the UE 102 to only SCells that are not on the dormancy list. At stage 8b, the serving gNB 110-1 activates the UE SRS transmission. At stage 8c, the serving gNB 110-1 sends an NRPPa POSITIONING ACTIVATION RESPONSE message to the LMF 120 indicating SRS activation of the UE 102.

At stage 9, the LMF 120 provides the UL information to the selected gNBs 110 in a NRPPa MEASUREMENT REQUEST message. In one implementation, if the dormancy configuration was not updated to remove SCells from the dormancy list, e.g., at stages 7a and 7b, the NRPPa MEASUREMENT REQUEST may be based on the dormancy configuration provided to the LMF 120 at stages 3 or 6 and may be schedule measurements of UL SRS from the UE 102 from only gNBs 110 that support SCells that are not on the dormancy list. In another implementation, the message may include an indication of one or more SCells from the dormancy configuration and that are to be used for positioning and should be brought out of dormancy in selected or all monitoring occasions during the positioning session. In some implementations, the indication of the one or more SCells may be provided in a separate message to the serving gNB 110-1 than the NRPPa MEASUREMENT REQUEST message. The message in stage 9 includes all information required to enable the gNBs/TRPs 110 to perform the UL measurements.

At stage 10, the LMF 120 configures assistance data and sends a LPP Provide Assistance Data message to the UE 102 via the serving gNB 110-1. The assistance data includes any required information for the UE 102 to perform the necessary DL PRS measurements (e.g. includes PRS configuration information sent or received by LMF 120 at stage 2). In some implementations, if the dormancy configuration was not updated to remove SCells from the dormancy list, e.g., at stages 7a and 7b, the assistance data configured by the LMF 120 and provided to the UE 102 may be based on the dormancy configuration provided to the LMF 120 at stages 3 or 6 and may be schedule DL measurements by the UE 102 from only SCells that are not on the dormancy list.

At stage 11, the LMF 120 sends a LPP Request Location Information message to the UE 102 to request DL measurements to support one or more positioning measurement techniques, e.g., UE Rx-Tx to support multi-RTT. The Request Location Information message may further indicate the type of positioning method to be used, e.g., UE assisted multi-RTT.

At stage 13a, the gNBs 110 transmits DL PRS and the UE 102 performs location measurements, e.g., of the DL PRS measurements such as RSTD, RSRP, RSRQ, AOD, AOA, Rx-Tx from all gNBs 110 provided in the assistance data at stage 10. The location measurements may additionally or alternatively include at least one of a GNSS pseudorange, a GNSS codephase, a GNSS carrier phase, a WiFi measurement (RSSI, AOA or RTT), a Bluetooth measurement (RSSI, AOA or RTT), a measurement of DL NR signals from a gNB (RSTD, RSRP, RSRQ, AOD, AOA, Rx-Tx), a measurement performed by a sensor, such as an inertial sensor, barometer, etc.

At stage 13b, the UE 102 transmits UL SRS and each gNB 110, e.g., SCell, configured at stage 9 measures the UL SRS transmissions from the UE 102, such as AOA, RSRP, Rx-Tx, TOA.

At stage 14, the UE 102 may report the measurements performed at stage 13a to the LMF 120 in a LPP Provide Location Information message, for UE assisted positioning method.

At stage 15, each gNBs 110 reports the measurements performed at stage 13b to the LMF 120 in NRPPa Measurement Response messages. As illustrated with dotted lines, in a UE based positioning method, the gNBs 110 may report any measurements performed at stage 13b to the UE 102.

At stage 16a, the LMF 120 determines the location of the UE based on the measurements received at stages 14 and 15. For example, the LMF 120 may determine the RTTs from the UE 102 and gNB 110 Rx-Tx Time Difference Measurements for each gNB 110 for which corresponding UL and DL measurements were provided at stages 10 and 11 and calculate the position of the UE 102. As illustrated by stage 16b, in a UE based positioning method, the UE 102 may determine the location of the UE 102 based on any measurements performed at stage 13a and any measurements received from the gNBs 110 at stage 15, as well as positions of the gNBs 110, which may be received in the assistance data at stage 10.

Figure 9:
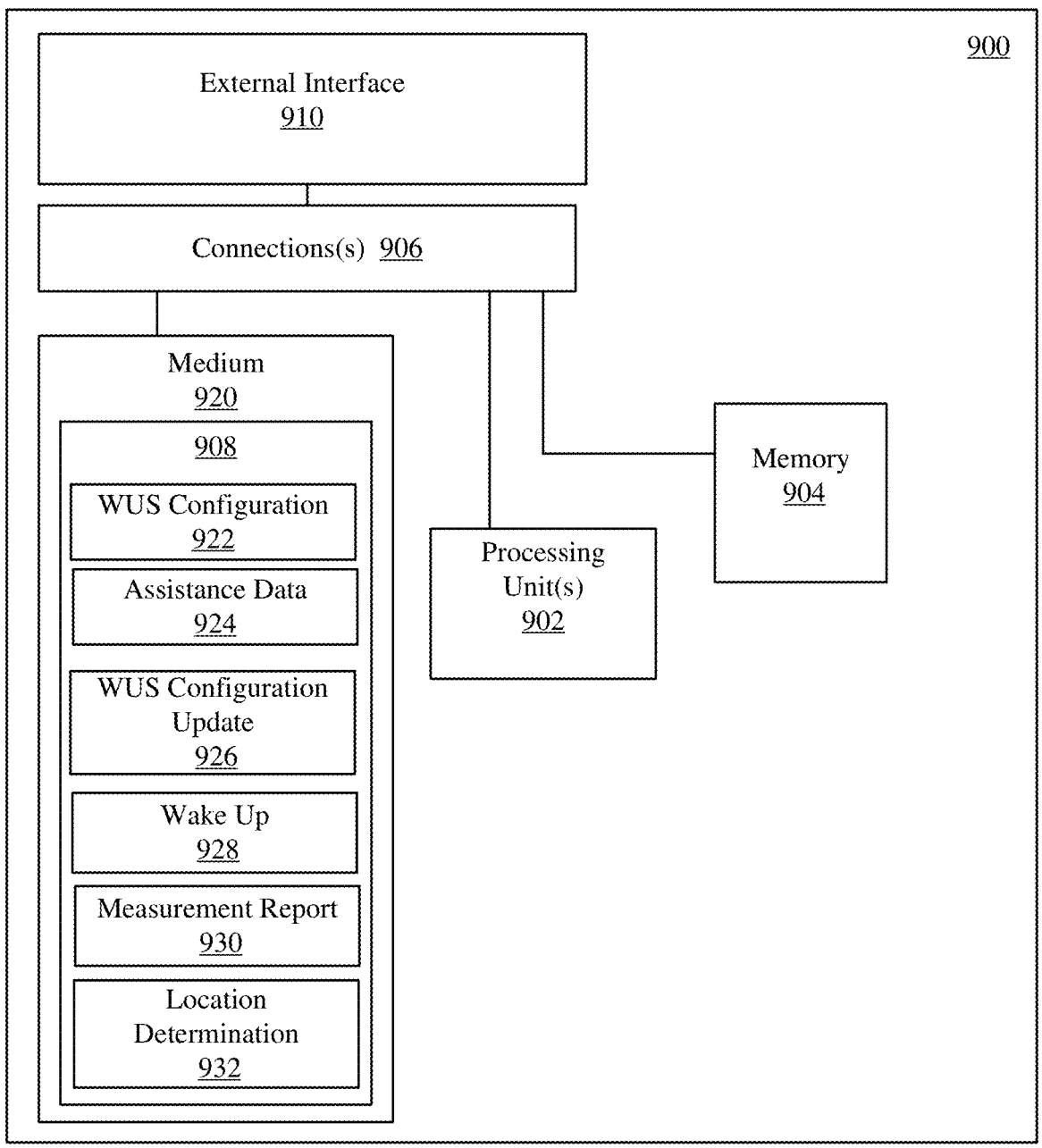
FIG. 9 shows a schematic block diagram illustrating certain exemplary features of a location server configured for supporting positioning a UE operating with WUS configurations in a DRX mode during a positioning session.

FIG. 9 shows a schematic block diagram illustrating certain exemplary features of a location server 900 in a wireless network that is configured for supporting positioning a UE operating with WUS configurations in a DRX mode during a positioning session, as discussed herein. The location server 900 may be an LMF 120, an SLP 129, or LSS 117 (or LMC) in the NG-RAN 135, as shown in FIGS. 1 and 2. The location server 900 may be configured to perform the messaging flow 800 illustrated in FIG. 8, and the procedure 1200 illustrated in FIG. 12 along with other algorithms discussed herein. The location server 900 may, for example, include one or more processors 902, memory 904, an external interface 910 (e.g., wireline or wireless network interface to base stations, UEs, and/or entities in the core network), which may be operatively coupled with one or more connections 906 (e.g., buses, lines, fibers, links, etc.)

to non-transitory computer readable medium 920 and memory 904. In certain example implementations, all or part of location server 900 may take the form of a chipset, and/or the like. Depending on the implementation, the location server 900 may include additional components not illustrated herein.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of location server 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in location server 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in location server 900 is merely exemplary, and as such the functionality of the modules and/or data structures may be combined, separated, and/or be structured in different ways depending upon the implementation of the location server 900.

The medium 920 and/or memory 904 may include a WUS configuration module 922 that when implemented by the one or more processors 902 configures the one or more processors 902 to receive, via the external interface 910, a dormancy configuration for SCells for the UE in a WUS configuration such as from the UE, e.g., in capabilities message, or from a serving base station for the UE.

The medium 920 and/or memory 904 may include an assistance data module 924 that when implemented by the one or more processors 902 configures the one or more processors 902 to configure and send to the UE, via the external interface 910, assistance data and schedule uplink sounding reference signals (SRSs) for SCells based on the dormancy configuration so that only SCells that are not included in the dormancy configuration for the SCells are used for positioning the UE thereby avoiding the need to alter the dormancy states of the SCELLS.

The medium 920 and/or memory 904 may include a WUS configuration update module 926 that when implemented by the one or more processors 902 configures the one or more processors 902 to send to the serving base station supporting the PCell for the UE, via the external interface 910, an indication to remove one or more SCells from the dormancy configuration during the positioning session. The one or more processors 902 may be further configured to indicate a time period or duration of the positioning session during which the one or more SCells should be removed from the dormancy configuration.

The medium 920 and/or memory 904 may include a wake up module 928 that when implemented by the one or more processors 902 configures the one or more processors 902 to send to the serving base station supporting the PCell for the UE, via the external interface 910, an indication to bring one or more SCells out of dormancy for one or more WUS monitoring occasions during the positioning session. For example, the one or more processors 902 may be configured to indicate that the PCell should bring all SCells out of dormancy for all WUS monitoring occasions during the positioning session or may indicate only select SCells should be brought out of dormancy for monitoring occasions during positioning occasions necessary for the SCells. By way of example, the indication may be included at least one uplink SRS to be transmitted by the UE to the one or more SCells for uplink measurement, downlink reference signals to be transmitted by the one or more SCells to the UE for downlink measurement, or a combination thereof.

The medium 920 and/or memory 904 may include a measurement report module 930 that when implemented by the one or more processors 902 configures the one or more processors 902 to receive, via external interface 910, measurement reports from the UE and/or one or more base stations.

The medium 920 and/or memory 904 may include a location determination module 932 that when implemented by the one or more processors 902 configures the one or more processors 902 to determine a location for the UE based on the location measurements.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support positioning for UE operating with WUS configurations in a DRX mode during a positioning session, in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include an external interface 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

Figure 10:
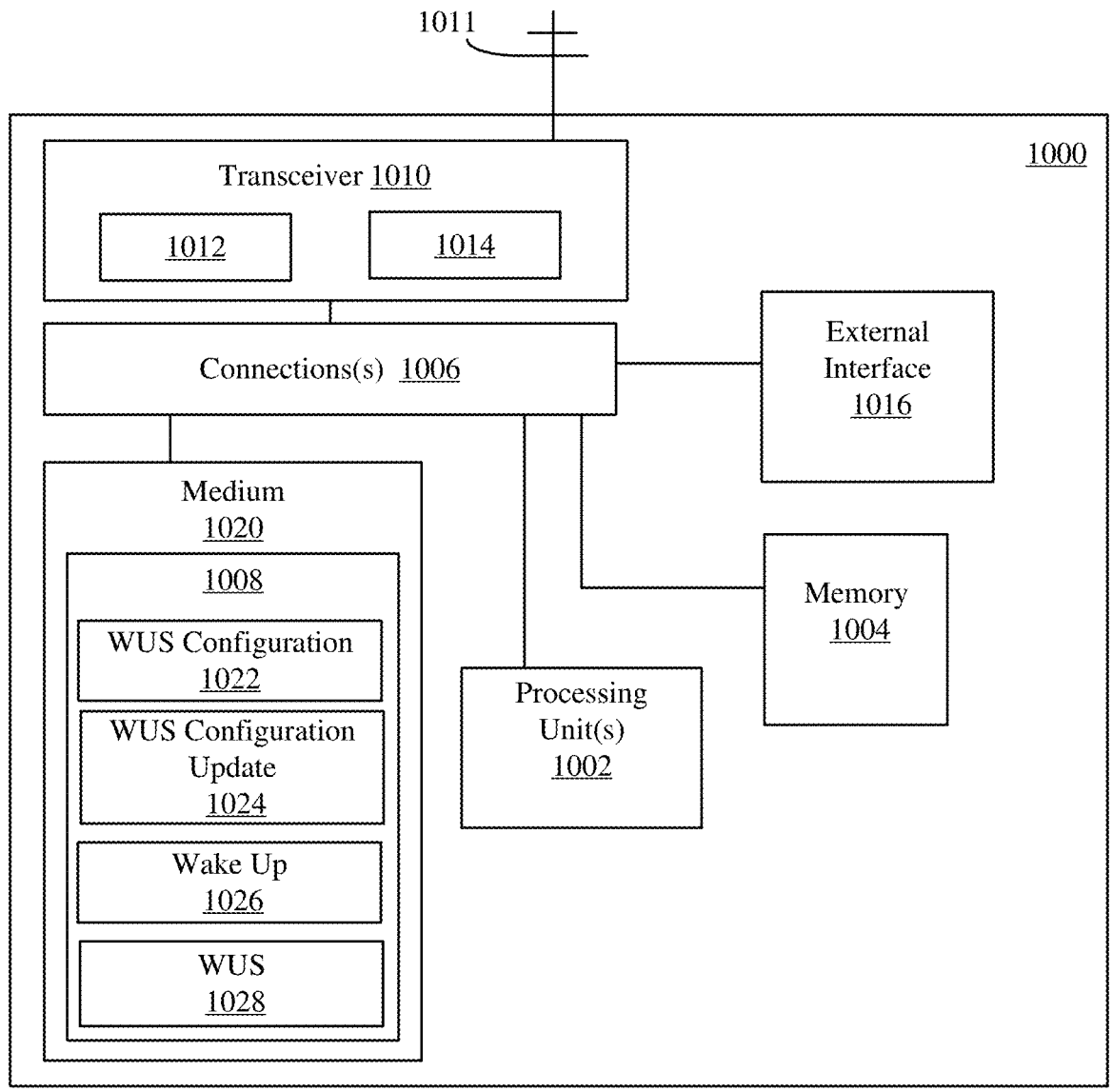
FIG. 10 shows a schematic block diagram illustrating certain exemplary features of a base station configured for supporting positioning a UE operating with WUS configurations in a DRX mode during a positioning session.

FIG. 10 shows a schematic block diagram illustrating certain exemplary features of a base station 1000, e.g., base station 110 in FIGS. 1 and 2, which may be a serving base station supporting a primary serving cell (PCell) for a UE, and is configured to support positioning for UE operating with WUS configurations in a DRX mode during a positioning session, as described herein. The base station 1000 may be configured to perform the messaging flow 800 illustrated in FIG. 8, and the procedure 1300 illustrated in FIG. 13 along with other algorithms discussed herein. Base station 1000 may, for example, include one or more processors 1002, memory 1004, an external interface, which may include a transceiver 1010 (e.g., wireless network interface) and an external interface 1016 (e.g., wireline or wireless network interface to other base stations and/or the core network), which may be operatively coupled with one or more connections 1006 (e.g., buses, lines, fibers, links, etc.) to non-transitory computer readable medium 1020 and memory 1004. The base station 1000 may further include additional items, which are not shown, such as a user interface that may include e.g., a display, a keypad or other input device, such as virtual keypad on the display, through which a user may interface with the UE, or a satellite positioning system receiver. In certain example implementations, all or part of base station 1000 may take the form of a chipset, and/or the like. Transceiver 1010 may, for example, include a transmitter 1012 enabled to transmit one or more signals over one or more types of wireless communication networks and a receiver 1014 to receive one or more signals transmitted over the one or more types of wireless communication networks. The external interface 1016 may be a wired or wireless interface capable of connecting to other base stations in the RAN or network entities, such as a location server, e.g., LMF 120 shown in FIG. 1.

In some embodiments, base station 1000 may include antenna 1011, which may be internal or external. Antenna 1011 may be used to transmit and/or receive signals processed by transceiver 1010. In some embodiments, antenna 1011 may be coupled to transceiver 1010. In some embodiments, measurements of signals received (transmitted) by base station 1000 may be performed at the point of connection of the antenna 1011 and transceiver 1010. For example, the measurement point of reference for received (transmitted) RF signal measurements may be an input (output) terminal of the receiver 1014 (transmitter 1012) and an output (input) terminal of the antenna 1011. In a base station 1000 with multiple antennas 1011 or antenna arrays, the antenna connector may be viewed as a virtual point representing the aggregate output (input) of multiple antennas. In some embodiments, base station 1000 may measure received signals including signal strength and TOA measurements and the raw measurements may be processed by the one or more processors 1002.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of base station 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in base station 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in base station 1000 is merely exemplary, and as such the functionality of the modules and/or data structures may be combined, separated, and/or be structured in different ways depending upon the implementation of the base station 1000.

The medium 1020 and/or memory 1004 may include a WUS configuration module 1022 that when implemented by the one or more processors 1002 configures the one or more processors 1002 to generate and send to the UE via transceiver 1010 a WUS configuration including a dormancy list of secondary serving cells (SCells) for the UE that are configured for dormancy, e.g., via an RRC message. The one or more processors 1002 may be configured to send to a location server, via the external interface 1016, the dormancy configuration, such as a dormancy list for the SCells.

The medium 1020 and/or memory 1004 may include a WUS configuration update module 1024 that when implemented by the one or more processors 1002 configures the one or more processors 1002 to receive from a location server, via the external interface 1016, an indication of one or more SCells that are to be used for positioning, such as an indication of the one or more of the SCells that are to be removed from the dormancy list. The one or more processors 1002 may be further configured to remove one or more of the SCells on the dormancy list from dormancy during the positioning session based on the indication received from the location server, e.g., by updating the WUS configuration to remove the one or SCells from the dormancy list and to send to the UE, via the transceiver 1010, and update for the WUS configuration to remove the one or more of the SCells. The one or more processors 1002 may be further configured to receive from the location server, via the external interface 1016, a time period or duration during which the SCells are to be removed from the dormancy list, and to configure and send to the UE, via the transceiver 1010, an update of the configuration list at the expiration of the time period to include the SCells on the dormancy list.

The medium 1020 and/or memory 1004 may include a wake up module 1026 that when implemented by the one or more processors 1002 configures the one or more processors 1002 to receive from a location server, via the external interface 1016, an indication of one or more SCells that are to be used for positioning, such as an indication of SCells that are to be brought out of dormancy for positioning, such as an indication of at least one uplink SRS to be transmitted by the UE to one or more SCells for uplink measurement, downlink reference signals to be transmitted by the one or more SCells to the UE for downlink measurement, or a combination thereof.

The medium 1020 and/or memory 1004 may include a WUS module 1028 that when implemented by the one or more processors 1002 configures the one or more processors 1002 to remove one or more of the SCells on the dormancy list from dormancy during the positioning session based on the indication received from the location server, e.g., by sending to the UE, via the transceiver 1010, a WUS signal to wake-up and to bring one or more SCells on the dormancy list out of dormancy for one or more WUS monitoring occasions during the positioning session. For example, the one or more processors 1002 may be configured to bring all SCells on the dormancy list out of dormancy for all WUS monitoring occasions during the positioning session. The one or more processors 1002 may be configured to determine WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof, and to send a WUS signal to the UE, via the transceiver 1010 accordingly.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support positioning for a UE operating with WUS configurations in a DRX mode during a positioning session in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable code 1008 stored thereon, which if executed by one or more processors 1002 may be operatively enabled to perform all or portions of the example operations as described herein. Computer readable medium 1020 may be a part of memory 1004.

Figure 11:
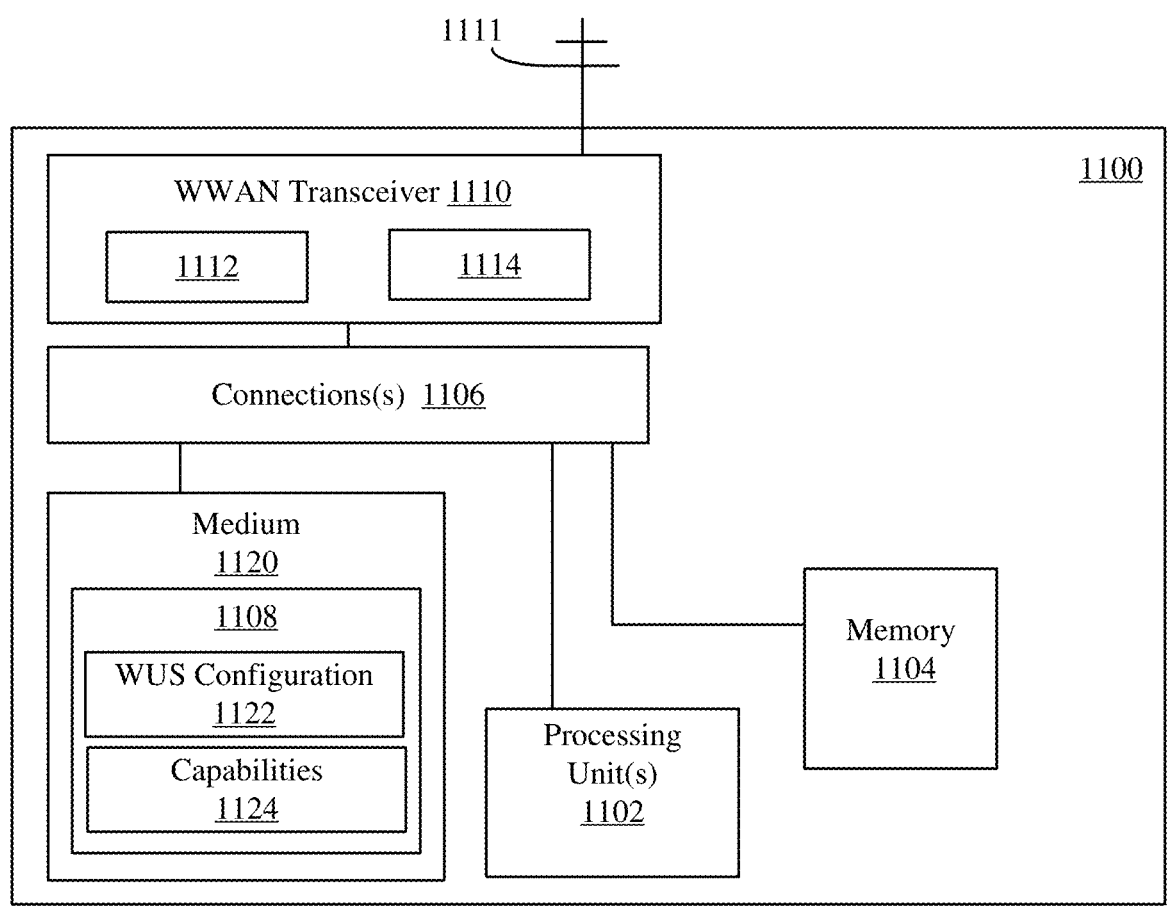
FIG. 11 shows a schematic block diagram illustrating certain exemplary features of a UE configured for supporting positioning while operating with WUS configurations in a DRX mode during a positioning session.

FIG. 11 shows a schematic block diagram illustrating certain exemplary features of a UE 1100, e.g., which may be UE 102 shown in FIG. 1, enabled to support positioning while operating with WUS configurations in a DRX mode during a positioning session, as described herein. The UE 1100 may be configured to perform the messaging flow 800 illustrated in FIG. 8, and the procedure 1400 illustrated in FIG. 14 along with other algorithms discussed herein. UE 1100 may, for example, include one or more processors 1102, memory 1104, an external interface such as a transceiver 1110 (e.g., wireless network interface), which may be operatively coupled with one or more connections 1106 (e.g., buses, lines, fibers, links, etc.) to non-transitory computer readable medium 1120 and memory 1104. The UE 1100 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1100 may take the form of a chipset, and/or the like. Transceiver 1110 may, for example, include a transmitter 1112 enabled to transmit one or more signals over one or more types of wireless communication networks and a receiver 1114 to receive one or more signals transmitted over the one or more types of wireless communication networks.

In some embodiments, UE 1100 may include antenna 1111, which may be internal or external. UE antenna 1111 may be used to transmit and/or receive signals processed by transceiver 1110. In some embodiments, UE antenna 1111 may be coupled to transceiver 1110. In some embodiments, measurements of signals received (transmitted) by UE 1100 may be performed at the point of connection of the UE antenna 1111 and transceiver 1110. For example, the measurement point of reference for received (transmitted) RF signal measurements may be an input (output) terminal of the receiver 1114 (transmitter 1112) and an output (input) terminal of the UE antenna 1111. In a UE 1100 with multiple UE antennas 1111 or antenna arrays, the antenna connector may be viewed as a virtual point representing the aggregate output (input) of multiple UE antennas. In some embodiments, UE 1100 may measure received signals including signal strength and TOA measurements and the raw measurements may be processed by the one or more processors 1102.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of UE 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in UE 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in UE 1100 is merely exemplary, and as such the functionality of the modules and/or data structures may be combined, separated, and/or be structured in different ways depending upon the implementation of the UE 1100.

The medium 1120 and/or memory 1104 may include a WUS configuration module 1122 that when implemented by the one or more processors 1102 configures the one or more processors 1102 to receive a WUS configuration message via transceiver 1110, e.g., from a serving base station supporting a primary serving cell (PCell) via an RRC message. The WUS configuration for example, may include a dormancy list of secondary serving cells (SCells) for the UE that are configured for dormancy.

The medium 1120 and/or memory 1104 may include a capabilities module 1124 that when implemented by the one or more processors 1102 configures the one or more processors 1102 to receive from the location server, via the transceiver 1110, a capabilities request message during a positioning session. The one or more processors 1102 may be further configured to provide a capabilities response message to the location server, via the transceiver 1110, that includes the dormancy list of SCells for the UE.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support positioning while operating with WUS configurations in a DRX mode during a positioning session in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
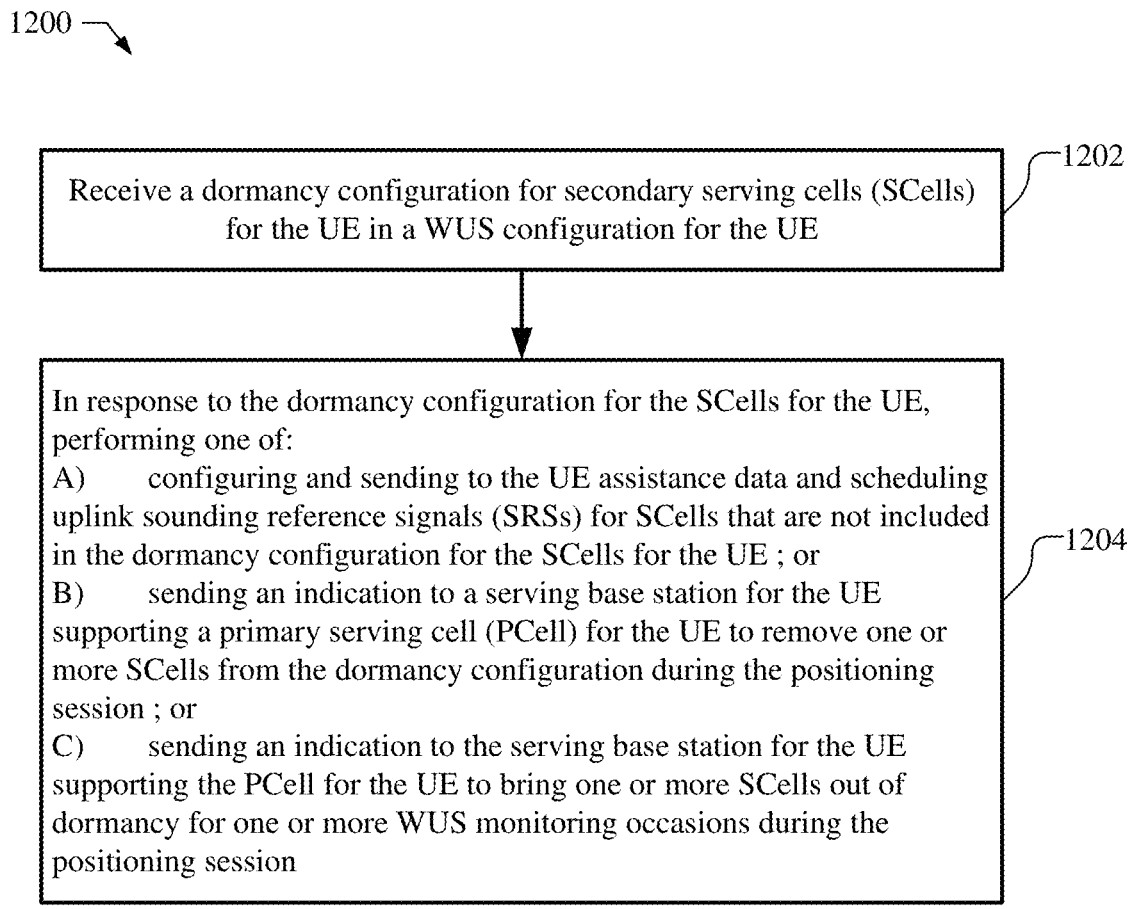
FIG. 12 shows a flowchart for an exemplary method for positioning a UE operating with WUS configurations in a DRX mode during a positioning session.

FIG. 12 shows a flowchart for an exemplary method 1200 performed by a location server, such as LMF 120, for positioning a UE operating with WUS configurations in a DRX mode during a positioning session, in a manner consistent with disclosed implementations.

At block 1202, the location server receives a dormancy configuration for secondary serving cells (SCells) for the UE in a WUS configuration for the UE, e.g., as discussed at stage 3 or stage 6 of FIG. 8. For example, the dormancy configuration may be received from the UE in a capabilities message. In another example, the dormancy configuration is received from the serving base station for the UE. A means for receiving a dormancy configuration for secondary serving cells (SCells) for the UE in a WUS configuration for the UE may include, e.g., the external interface 910 and one or more processors 902 with dedicated hardware or implementing executable code or software instructions in memory 904 and/or medium 920, such as the WUS configuration module 922, in the location server 900 shown in FIG. 9.

At block 1204, in response to the dormancy configuration for the SCells for the UE, the location server may perform one of: A) configuring and sending to the UE assistance data and schedule uplink sounding reference signals (SRSs) for SCells that are not included in the dormancy configuration for the SCells for the UE, e.g., as discussed at stages 9 and 10 of FIG. 8; or B) sending an indication to a serving base station for the UE supporting a primary serving cell (PCell) for the UE to remove one or more SCells from the dormancy configuration during the positioning session, e.g., as discussed at stage 7a of FIG. 8; or C) sending an indication to the serving base station for the UE supporting the PCell for the UE to bring one or more SCells out of dormancy for one or more WUS monitoring occasions during the positioning session, e.g., as discussed at stage 9 of FIG. 8. A means for configuring and sending to the UE assistance data and scheduling uplink sounding reference signals (SRSs) for SCells that are not included in the dormancy configuration for the SCells for the UE may include, e.g., the external interface 910 and one or more processors 902 with dedicated hardware or implementing executable code or software instructions in memory 904 and/or medium 920, such as the assistance data module 924, in the location server 900 shown in FIG. 9. A means for sending an indication to a serving base station for the UE supporting a primary serving cell (PCell) for the UE to remove one or more SCells from the dormancy configuration during the positioning session may include, e.g., the external interface 910 and one or more processors 902 with dedicated hardware or implementing executable code or software instructions in memory 904 and/or medium 920, such as the WUS configuration update module 926, in the location server 900 shown in FIG. 9. A means for sending an indication to the serving base station for the UE supporting the PCell for the UE to bring one or more SCells out of dormancy for one or more WUS monitoring occasions during the positioning session may include, e.g., the external interface 910 and one or more processors 902 with dedicated hardware or implementing executable code or software instructions in memory 904 and/or medium 920, such as the wake up module 928, in the location server 900 shown in FIG. 9.

In some implementations, the location server receives location measurements for the UE from one or more other entities, e.g., as discussed at stages 14 and/or 15 of FIG. 8, and determines a location for the UE based on the location measurements, e.g., as discussed at stage 16a of FIG. 8. A means for receiving location measurements for the UE from one or more other entities may include, e.g., the external interface 910 and one or more processors 902 with dedicated hardware or implementing executable code or software instructions in memory 904 and/or medium 920, such as the measurement report module 930, in the location server 900 shown in FIG. 9. A means for determining a location for the UE based on the location measurements may include, e.g., the one or more processors 902 with dedicated hardware or implementing executable code or software instructions in memory 904 and/or medium 920, such as the location determination module 932, in the location server 900 shown in FIG. 9.

In one implementation, the location server may send the indication to the serving base station for the UE to remove the one or more SCells from the dormancy configuration during the positioning session, and the location server may further send a time period during which the one or more SCells are removed from the dormancy configuration, e.g., as discussed at stage 7a of FIG. 8. A means for sending a time period during which the one or more SCells are removed from the dormancy configuration may include, e.g., the external interface 910 and one or more processors 902 with dedicated hardware or implementing executable code or software instructions in memory 904 and/or medium 920, such as the WUS configuration update module 926, in the location server 900 shown in FIG. 9.

In one implementation, the location server may send the indication to the serving base station for the UE to bring the one or more SCells out of dormancy for the one or more WUS monitoring occasions during the positioning session, where the location server indicates to bring all SCells out of dormancy for all WUS monitoring occasions during the positioning session, e.g., as discussed at stage 9 of FIG. 8.

In one implementation, the location server may send the indication to the serving base station for the UE to bring the one or more SCells out of dormancy for the one or more WUS positioning occasions during the positioning session, where the location server indicates at least one uplink SRS to be transmitted by the UE to the one or more SCells for uplink measurement, downlink reference signals to be transmitted by the one or more SCells to the UE for downlink measurement, or a combination thereof, as discussed at stages 9 and 10 of FIG. 8.

Figure 13:
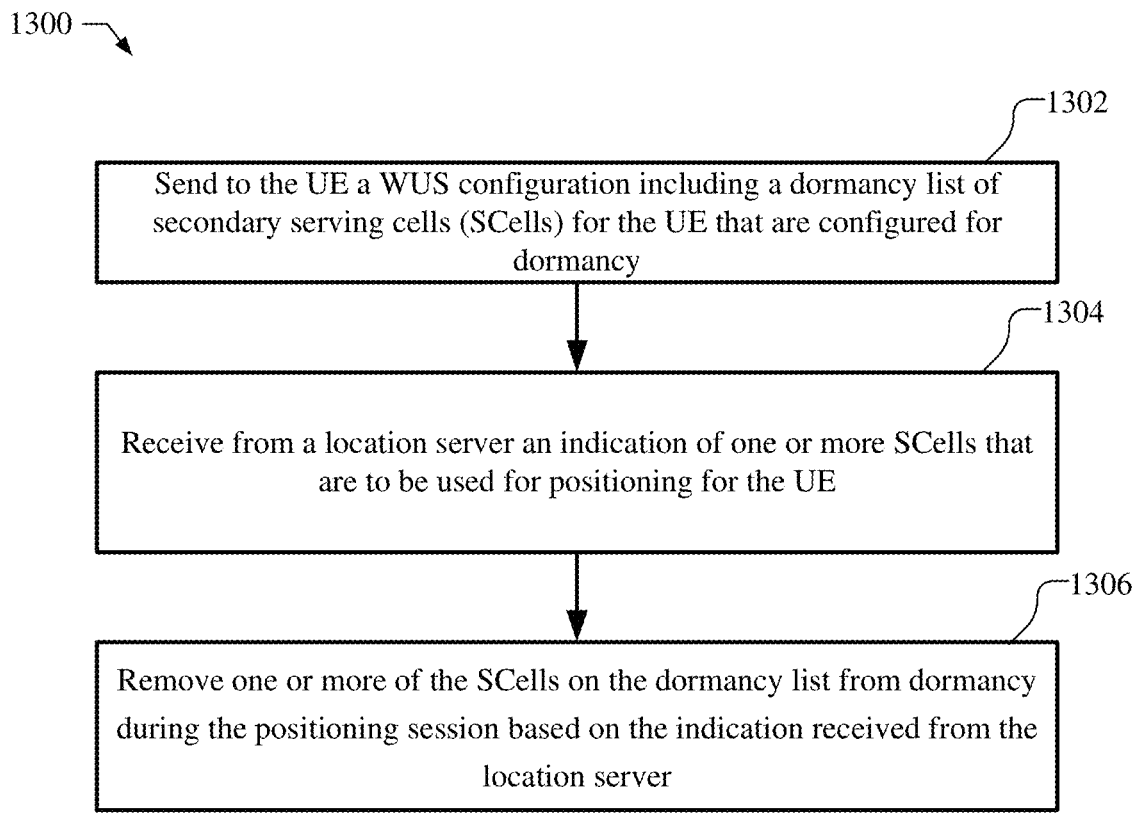
FIG. 13 shows a flowchart for an exemplary method for positioning a UE operating with WUS configurations in a DRX mode during a positioning session.

FIG. 13 shows a flowchart for an exemplary method 1300 performed by a serving base station supporting a primary serving cell (PCell), such as serving base station 110-1, for positioning a UE operating with WUS configurations in a DRX mode during a positioning session, in a manner consistent with disclosed implementations.

At block 1302, the serving base station may send to the UE a WUS configuration including a dormancy list of secondary serving cells (SCells) for the UE that are configured for dormancy, e.g., as discussed at stage 1 of FIG. 8. A means for sending to the UE a WUS configuration including a dormancy list of secondary serving cells (SCells) for the UE that are configured for dormancy may include, e.g., the wireless transceiver 1010 and one or more processors 1002 with dedicated hardware or implementing executable code or software instructions in memory 1004 and/or medium 1020, such as the WUS configuration module 1022, in the base station 1000 shown in FIG. 10.

At block 1304, the serving base station may receive from a location server an indication of one or more SCells that are to be used for positioning for the UE, e.g., as discussed at stages 7a or 9 of FIG. 8. A means for receiving from a location server an indication of one or more SCells that are to be used for positioning for the UE may include, e.g., the external interface 1016 and one or more processors 1002 with dedicated hardware or implementing executable code or software instructions in memory 1004 and/or medium 1020, such as the WUS configuration update module 1024 or wake up module 1026, in the base station 1000 shown in FIG. 10.

At block 1306, the serving base station removes one or more of the SCells on the dormancy list from dormancy during the positioning session based on the indication received from the location server, e.g., as discussed at stage 7b or stage 12 of FIG. 8. A means for removing one or more of the SCells on the dormancy list from dormancy during the positioning session based on the indication received from the location server may include, e.g., the wireless transceiver 1010 and one or more processors 1002 with dedicated hardware or implementing executable code or software instructions in memory 1004 and/or medium 1020, such as the WUS configuration update module 1024 or WUS module 1028, in the base station 1000 shown in FIG. 10.

In one implementation, the serving base station may send the dormancy list to the location server, e.g., as discussed at stage 6 of FIG. 8. A means for sending the dormancy list to the location server may include, e.g., the external interface 1016 and one or more processors 1002 with dedicated hardware or implementing executable code or software instructions in memory 1004 and/or medium 1020, such as the WUS configuration module 1022, in the base station 1000 shown in FIG. 10.

In one implementation, the indication of the one or more SCells that are to be used for positioning for the UE may be an indication of the one or more of the SCells to remove from the dormancy list, e.g., as discussed at stage 7a of FIG. 8. The serving base station may remove the one or more of the SCells on the dormancy list from dormancy by updating the WUS configuration to remove the one or more of the SCells on the dormancy list, e.g., as discussed at stage 7b. A means for updating the WUS configuration to remove the one or more of the SCells on the dormancy list may include, e.g., the wireless transceiver 1010 and one or more processors 1002 with dedicated hardware or implementing executable code or software instructions in memory 1004 and/or medium 1020, such as the WUS configuration update module 1024, in the base station 1000 shown in FIG. 10. The serving base station may receive from the location server a time period during which the SCells are to be removed from the dormancy list, e.g., as discussed at stage 7a of FIG. 8, and may update the WUS configuration after the time period to include the one or more of the SCells on the dormancy list, e.g., as discussed at stage 7b of FIG. 8. A means for receiving from the location server a time period during which the SCells are to be removed from the dormancy list may include, e.g., the wireless transceiver 1010 and one or more processors 1002 with dedicated hardware or implementing executable code or software instructions in memory 1004 and/or medium 1020, such as the WUS configuration update module 1024, in the base station 1000 shown in FIG. 10. A means for updating the WUS configuration after the time period to include the one or more of the SCells on the dormancy list may include, e.g., the wireless transceiver 1010 and one or more processors 1002 with dedicated hardware or implementing executable code or software instructions in memory 1004 and/or medium 1020, such as the WUS configuration update module 1024, in the base station 1000 shown in FIG. 10.

In one implementation, the indication of the one or more SCells that are to be used for positioning for the UE may be an indication of at least one uplink SRS to be transmitted by the UE to one or more SCells for uplink measurement, downlink reference signals to be transmitted by the one or more SCells to the UE for downlink measurement, or a combination thereof, e.g., as discussed at stages 9 and 10 of FIG. 8. The serving base station may remove the one or more of the SCells on the dormancy list from dormancy by sending a WUS signal to the UE to wake-up and to bring all SCells on the dormancy list out of dormancy for all WUS monitoring occasions during the positioning session, e.g., as discussed at stage 12 of FIG. 8. A means for sending a WUS signal to the UE to wake-up and to bring all SCells on the dormancy list out of dormancy for all WUS monitoring occasions during the positioning session may include, e.g., the wireless transceiver 1010 and one or more processors 1002 with dedicated hardware or implementing executable code or software instructions in memory 1004 and/or medium 1020, such as the WUS module 1028, in the base station 1000 shown in FIG. 10. In one implementation, the serving base station may determine WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof, and may send a WUS signal to the UE to wake-up and to bring the specific SCells on the dormancy list out of dormancy for the determined WUS monitoring occasions, as discussed at stage 12 of FIG. 8. For example, the WUS signal for each determined WUS monitoring occasion may indicate that the UE is to wake-up and identify the SCells to be brought out of dormancy. A means for determining WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof may include, e.g., the one or more processors 1002 with dedicated hardware or implementing executable code or software instructions in memory 1004 and/or medium 1020, such as the WUS module 1028, in the base station 1000 shown in FIG. 10. A means for sending a WUS signal to the UE to wake-up and to bring the specific SCells on the dormancy list out of dormancy for the determined WUS monitoring occasions may include, e.g., the wireless transceiver 1010 and one or more processors 1002 with dedicated hardware or implementing executable code or software instructions in memory 1004 and/or medium 1020, such as the WUS module 1028, in the base station 1000 shown in FIG. 10.

Figure 14:
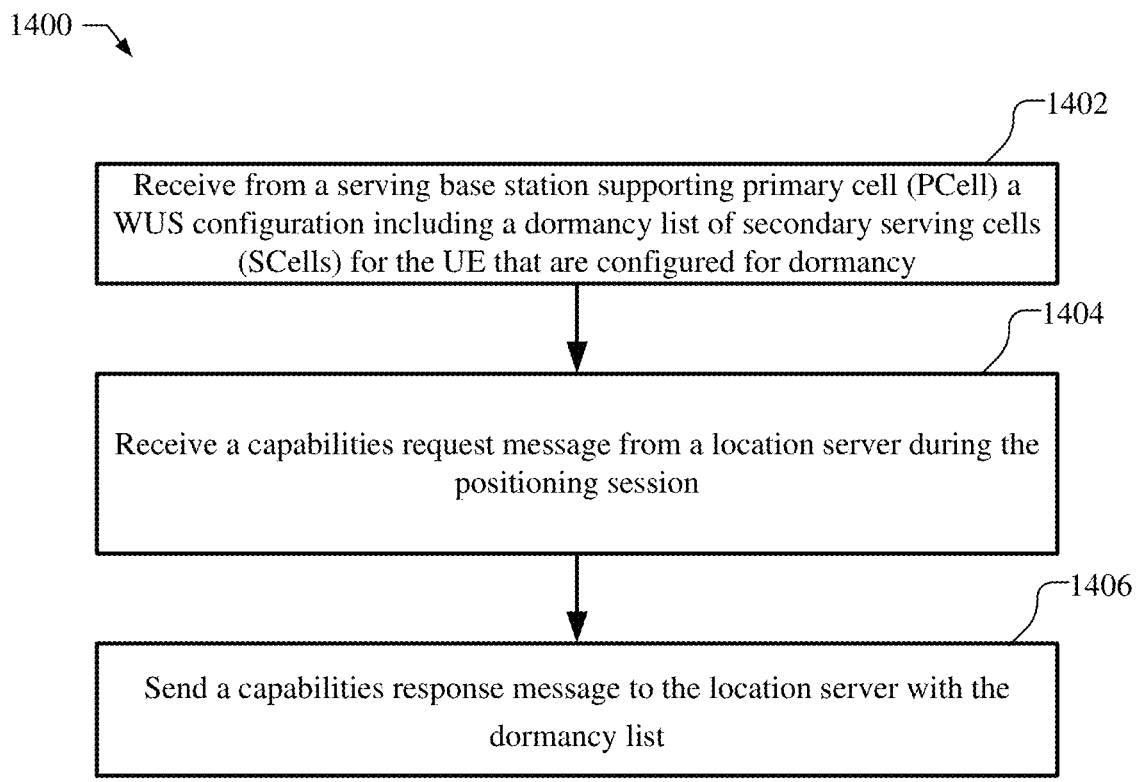
FIG. 14 shows a flowchart for an exemplary method for positioning a UE operating with WUS configurations in a DRX mode during a positioning session.

FIG. 14 shows a flowchart for an exemplary method 1400 performed by a UE, such as a UE 102, for positioning while operating with WUS configurations in a DRX mode during a positioning session, in a manner consistent with disclosed implementations.

At block 1402, the UE may receive from a serving base station supporting a primary cell (PCell) a WUS configuration including a dormancy list of secondary serving cells (SCells) for the UE that are configured for dormancy, e.g., as discussed at stage 1 of FIG. 8. A means for receiving from a serving base station supporting a primary cell (PCell) a WUS configuration including a dormancy list of secondary serving cells (SCells) for the UE that are configured for dormancy may include, e.g., the wireless transceiver 1110 and one or more processors 1102 with dedicated hardware or implementing executable code or software instructions in memory 1104 and/or medium 1120, such as the WUS configuration module 1122, in the UE 1100 shown in FIG. 11.

At block 1404, the UE may receive a capabilities request message from a location server during the positioning session, e.g., as discussed at stage 3 of FIG. 8. A means for receiving a capabilities request message from a location server during the positioning session may include, e.g., the wireless transceiver 1110 and one or more processors 1102 with dedicated hardware or implementing executable code or software instructions in memory 1104 and/or medium 1120, such as the capabilities module 1124, in the UE 1100 shown in FIG. 11.

At block 1406, the UE may send a capabilities response message to the location server with the dormancy list, as discussed at stage 3 of FIG. 8. A means for sending a capabilities response message to the location server with the dormancy list may include, e.g., the wireless transceiver 1110 and one or more processors 1102 with dedicated hardware or implementing executable code or software instructions in memory 1104 and/or medium 1120, such as the capabilities module 1124, in the UE 1100 shown in FIG. 11.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method performed by a location server for positioning a user equipment (UE) operating with wake-up signal (WUS) configurations in a discontinuous reception (DRX) mode during a positioning session, comprising: receiving a dormancy configuration for secondary serving cells (SCells) for the UE in a WUS configuration for the UE; and in response to the dormancy configuration for the SCells for the UE, performing one of: A) configuring and sending to the UE assistance data and scheduling uplink sounding reference signals (SRSs) for SCells that are not included in the dormancy configuration for the SCells for the UE; or B) sending an indication to a serving base station for the UE supporting a primary serving cell (PCell) for the UE to remove one or more SCells from the dormancy configuration during the positioning session; or C) sending an indication to the serving base station for the UE supporting the PCell for the UE to bring one or more SCells out of dormancy for one or more WUS monitoring occasions during the positioning session.

Clause 2. The method of clause 1, further comprising: receiving location measurements for the UE from one or more other entities; and determining a location for the UE based on the location measurements.

Clause 3. The method of either of clauses 1 or 2, wherein the dormancy configuration is received from the UE in a capabilities message.

Clause 4. The method of either of clauses 1 or 2, wherein the dormancy configuration is received from the serving base station for the UE.

Clause 5. The method of any of clauses 1-4, wherein the location server sends the indication to the serving base station for the UE to remove the one or more SCells from the dormancy configuration during the positioning session, further comprising sending a time period during which the one or more SCells are removed from the dormancy configuration.

Clause 6. The method of any of clauses 1-4, wherein the location server sends the indication to the serving base station for the UE to bring the one or more SCells out of dormancy for the one or more WUS monitoring occasions during the positioning session, where the location server indicates to bring all SCells out of dormancy for all WUS monitoring occasions during the positioning session.

Clause 7. The method of any of clauses 1-6, wherein the location server sends the indication to the serving base station for the UE to bring the one or more SCells out of dormancy for the one or more WUS positioning occasions during the positioning session, where the location server indicates at least one uplink SRS to be transmitted by the UE for the one or more SCells for uplink measurement, downlink reference signals to be transmitted in the one or more SCells to the UE for downlink measurement, or a combination thereof.

Clause 8. A location server configured for positioning a user equipment (UE) operating with wake-up signal (WUS) configurations in a discontinuous reception (DRX) mode during a positioning session, comprising: an external interface configured to wirelessly communicate with base stations in a wireless network; at least one memory; at least one processor coupled to the external interface and the at least one memory, wherein the at least one processor is configured to: receive, via the external interface, a dormancy configuration for secondary serving cells (SCells) for the UE in a WUS configuration for the UE; and in response to the dormancy configuration for the SCells for the UE, the at least one processor is configured to performs one of: A) configure and send, via the external interface, to the UE assistance data and scheduling uplink sounding reference signals (SRSs) for SCells that are not included in the dormancy configuration for the SCells for the UE; or B)

send, via the external interface, an indication to a serving base station for the UE supporting a primary serving cell (PCell) for the UE to remove one or more SCells from the dormancy configuration during the positioning session; or C) send, via the external interface, an indication to the serving base station for the UE supporting the PCell for the UE to bring one or more SCells out of dormancy for one or more WUS monitoring occasions during the positioning session.

Clause 9. The location server of clause 8, wherein the at least one processor is further configured to: receive, via the external interface, location measurements for the UE from one or more other entities; and determine a location for the UE based on the location measurements.

Clause 10. The location server of either of clauses 8 or 9, wherein the dormancy configuration is received from the UE in a capabilities message.

Clause 11. The location server of either of clauses 8 or 9, wherein the dormancy configuration is received from the serving base station for the UE.

Clause 12. The location server of any of clauses 8-11, wherein the location server sends the indication to the serving base station for the UE to remove the one or more SCells from the dormancy configuration during the positioning session, wherein the at least one processor is further configured to send, via the external interface, a time period during which the one or more SCells are removed from the dormancy configuration.

Clause 13. The location server of any of clauses 8-11, wherein the location server sends the indication to the serving base station for the UE to bring the one or more SCells out of dormancy for the one or more WUS monitoring occasions during the positioning session, where the location server indicates to bring all SCells out of dormancy for all WUS monitoring occasions during the positioning session.

Clause 14. The location server of any of clauses 8-11, wherein the location server sends the indication to the serving base station for the UE to bring the one or more SCells out of dormancy for the one or more WUS positioning occasions during the positioning session, where the location server indicates at least one uplink SRS to be transmitted by the UE for the one or more SCells for uplink measurement, downlink reference signals to be transmitted in the one or more SCells to the UE for downlink measurement, or a combination thereof.

Clause 15. A location server configured for positioning a user equipment (UE) operating with wake-up signal (WUS) configurations in a discontinuous reception (DRX) mode during a positioning session, comprising: means for receiving a dormancy configuration for secondary serving cells (SCells) for the UE in a WUS configuration for the UE; and in response to the dormancy configuration for the SCells for the UE, one of: A) means for configuring and sending to the UE assistance data and scheduling uplink sounding reference signals (SRSs) for SCells that are not included in the dormancy configuration for the SCells for the UE; or B) means for sending an indication to a serving base station for the UE supporting a primary serving cell (PCell) for the UE to remove one or more SCells from the dormancy configuration during the positioning session; or C) means for sending an indication to the serving base station for the UE supporting the PCell for the UE to bring one or more SCells out of dormancy for one or more WUS monitoring occasions during the positioning session.

Clause 16. The location server of clause 15, further comprising: means for receiving location measurements for the UE from one or more other entities; and means for determining a location for the UE based on the location measurements.

Clause 17. The location server of either of clauses 15 or 16, wherein the dormancy configuration is received from the UE in a capabilities message.

Clause 18. The location server of either of clauses 15 or 16, wherein the dormancy configuration is received from the serving base station for the UE.

Clause 19. The location server of any of clauses 15-18, wherein the location server sends the indication to the serving base station for the UE to remove the one or more SCells from the dormancy configuration during the positioning session, further comprising means for sending a time period during which the one or more SCells are removed from the dormancy configuration.

Clause 20. The location server of any of clauses 15-18, wherein the location server sends the indication to the serving base station for the UE to bring the one or more SCells out of dormancy for the one or more WUS monitoring occasions during the positioning session, where the location server indicates to bring all SCells out of dormancy for all WUS monitoring occasions during the positioning session.

Clause 21. The location server of any of clauses 15-18, wherein the location server sends the indication to the serving base station for the UE to bring the one or more SCells out of dormancy for the one or more WUS positioning occasions during the positioning session, where the location server indicates at least one uplink SRS to be transmitted by the UE for the one or more SCells for uplink measurement, downlink reference signals to be transmitted in the one or more SCells to the UE for downlink measurement, or a combination thereof.

Clause 22. A non-transitory computer readable storage medium including program code stored thereon, the program code is operable to configure at least one processor in a location server for positioning a user equipment (UE) operating with wake-up signal (WUS) configurations in a discontinuous reception (DRX) mode during a positioning session, the program code comprising instructions to: receive a dormancy configuration for secondary serving cells (SCells) for the UE in a WUS configuration for the UE; and in response to the dormancy configuration for the SCells for the UE, perform one of: A) configure and send to the UE assistance data and scheduling uplink sounding reference signals (SRSs) for SCells that are not included in the dormancy configuration for the SCells for the UE; or B) send an indication to a serving base station for the UE supporting a primary serving cell (PCell) for the UE to remove one or more SCells from the dormancy configuration during the positioning session; or C) send an indication to the serving base station for the UE supporting the PCell for the UE to bring one or more SCells out of dormancy for one or more WUS monitoring occasions during the positioning session.

Clause 23. The non-transitory computer readable storage medium of clause 22, wherein the program code further comprises instructions to: receive location measurements for the UE from one or more other entities; and determine a location for the UE based on the location measurements.

Clause 24. The non-transitory computer readable storage medium of either of clauses 22 or 23, wherein the dormancy configuration is received from the UE in a capabilities message.

Clause 25. The non-transitory computer readable storage medium of either of clauses 22 or 23, wherein the dormancy configuration is received from the serving base station for the UE.

Clause 26. The non-transitory computer readable storage medium of any of clauses 22-25, wherein the location server sends the indication to the serving base station for the UE to remove the one or more SCells from the dormancy configuration during the positioning session, wherein the program code further comprises instructions to send a time period during which the one or more SCells are removed from the dormancy configuration.

Clause 27. The non-transitory computer readable storage medium of any of clauses 22-25, wherein the location server sends the indication to the serving base station for the UE to bring the one or more SCells out of dormancy for the one or more WUS monitoring occasions during the positioning session, where the location server indicates to bring all SCells out of dormancy for all WUS monitoring occasions during the positioning session.

Clause 28. The non-transitory computer readable storage medium of any of clauses 22-25, wherein the location server sends the indication to the serving base station for the UE to bring the one or more SCells out of dormancy for the one or more WUS positioning occasions during the positioning session, where the location server indicates at least one uplink SRS to be transmitted by the UE for the one or more SCells for uplink measurement, downlink reference signals to be transmitted in the one or more SCells to the UE for downlink measurement, or a combination thereof.

Clause 29. A method performed by a serving base station supporting a primary serving cell (PCell) for positioning a user equipment (UE) operating with wake-up signal (WUS) configurations in a discontinuous reception (DRX) mode during a positioning session, comprising: sending to the UE a WUS configuration including a dormancy list of secondary serving cells (SCells) for the UE that are configured for dormancy; receiving from a location server an indication of one or more SCells that are to be used for positioning for the UE; removing one or more of the SCells on the dormancy list from dormancy during the positioning session based on the indication received from the location server.

Clause 30. The method of clause 29, further comprising sending the dormancy list to the location server.

Clause 31. The method of either of clauses 29 or 30, wherein the indication of the one or more SCells that are to be used for positioning for the UE comprises an indication of the one or more of the SCells to remove from the dormancy list.

Clause 32. The method of clause 31, wherein removing the one or more of the SCells on the dormancy list from dormancy comprises updating the WUS configuration to remove the one or more of the SCells on the dormancy list.

Clause 33. The method of clause 32, further comprising: receiving from the location server a time period during which the SCells are to be removed from the dormancy list; and updating the WUS configuration after the time period to include the one or more of the SCells on the dormancy list.

Clause 34. The method of any of clauses 29-33, wherein the indication of the one or more SCells that are to be used for positioning for the UE comprises an indication of at least one uplink SRS to be transmitted by the UE to one or more SCells for uplink measurement, downlink reference signals to be transmitted by the one or more SCells to the UE for downlink measurement, or a combination thereof.

Clause 35. The method of clause 34, wherein removing the one or more of the SCells on the dormancy list from dormancy comprises sending a WUS signal to the UE to wake-up and to bring all SCells on the dormancy list out of dormancy for all WUS monitoring occasions during the positioning session.

Clause 36. The method of clause 34, further comprising: determining WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof; and sending a WUS signal to the UE to wake-up and to bring the specific SCells on the dormancy list out of dormancy for the determined WUS monitoring occasions.

Clause 37. The method of clause 36, wherein the WUS signal for each determined WUS monitoring occasion indicates that the UE is to wake-up and identifies the SCells to be brought out of dormancy.

Clause 38. A serving base station configured for supporting a primary serving cell (PCell) for positioning a user equipment (UE) operating with wake-up signal (WUS) configurations in a discontinuous reception (DRX) mode during a positioning session, comprising: an external interface configured to wirelessly communicate with entities in a wireless network; at least one memory; at least one processor coupled to the external interface and the at least one memory, wherein the at least one processor is configured to: send, via the external interface, to the UE a WUS configuration including a dormancy list of secondary serving cells (SCells) for the UE that are configured for dormancy; receive, via the external interface, from a location server an indication of one or more SCells that are to be used for positioning for the UE; remove one or more of the SCells on the dormancy list from dormancy during the positioning session based on the indication received from the location server.

Clause 39. The serving base station of clause 38, wherein the at least one processor is further configured to send, via the external interface, the dormancy list to the location server.

Clause 40. The serving base station of either of clauses 38 or 39, wherein the indication of the one or more SCells that are to be used for positioning for the UE comprises an indication of the one or more of the SCells to remove from the dormancy list.

Clause 41. The serving base station of clause 40, wherein the at least one processor is configured to remove the one or more of the SCells on the dormancy list from dormancy by being configured to update the WUS configuration to remove the one or more of the SCells on the dormancy list.

Clause 42. The serving base station of clause 41, wherein the at least one processor is further configured to: receive, via the external interface, from the location server a time period during which the SCells are to be removed from the dormancy list; and update the WUS configuration after the time period to include the one or more of the SCells on the dormancy list.

Clause 43. The serving base station of any of clauses 38-42, wherein the indication of the one or more SCells that are to be used for positioning for the UE comprises an indication of at least one uplink SRS to be transmitted by the UE to one or more SCells for uplink measurement, downlink reference signals to be transmitted by the one or more SCells to the UE for downlink measurement, or a combination thereof.

Clause 44. The serving base station of clause 43, wherein the at least one processor is configured to remove the one or more of the SCells on the dormancy list from dormancy comprises send, via the external interface, a WUS signal to the UE to wake-up and to bring all SCells on the dormancy list out of dormancy for all WUS monitoring occasions during the positioning session.

Clause 45. The serving base station of clause 43, wherein the at least one processor is further configured to: determine WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof; and send, via the external interface, a WUS signal to the UE to wake-up and to bring the specific SCells on the dormancy list out of dormancy for the determined WUS monitoring occasions.

Clause 46. The serving base station of clause 45, wherein the WUS signal for each determined WUS monitoring occasion indicates that the UE is to wake-up and identifies the SCells to be brought out of dormancy.

Clause 47. A serving base station configured for supporting a primary serving cell (PCell) for positioning a user equipment (UE) operating with wake-up signal (WUS) configurations in a discontinuous reception (DRX) mode during a positioning session, comprising: means for sending to the UE a WUS configuration including a dormancy list of secondary serving cells (SCells) for the UE that are configured for dormancy; means for receiving from a location server an indication of one or more SCells that are to be used for positioning for the UE; means for removing one or more of the SCells on the dormancy list from dormancy during the positioning session based on the indication received from the location server.

Clause 48. The serving base station of clause 47, further comprising means for sending the dormancy list to the location server.

Clause 49. The serving base station of either of clauses 47 or 48, wherein the indication of the one or more SCells that are to be used for positioning for the UE comprises an indication of the one or more of the SCells to remove from the dormancy list.

Clause 50. The serving base station of clause 49, wherein the means for removing the one or more of the SCells on the dormancy list from dormancy comprises means for updating the WUS configuration to remove the one or more of the SCells on the dormancy list.

Clause 51. The serving base station of clause 50, further comprising: means for receiving from the location server a time period during which the SCells are to be removed from the dormancy list; and means for updating the WUS configuration after the time period to include the one or more of the SCells on the dormancy list.

Clause 52. The serving base station of any of clauses 47-51, wherein the indication of the one or more SCells that are to be used for positioning for the UE comprises an indication of at least one uplink SRS to be transmitted by the UE to one or more SCells for uplink measurement, downlink reference signals to be transmitted by the one or more SCells to the UE for downlink measurement, or a combination thereof.

Clause 53. The serving base station of clause 52, wherein means for removing the one or more of the SCells on the dormancy list from dormancy comprises means for sending a WUS signal to the UE to wake-up and to bring all SCells on the dormancy list out of dormancy for all WUS monitoring occasions during the positioning session.

Clause 54. The serving base station of clause 52, further comprising: means for determining WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof; and means for sending a WUS signal to the UE to wake-up and to bring the specific SCells on the dormancy list out of dormancy for the determined WUS monitoring occasions.

Clause 55. The serving base station of clause 54, wherein the WUS signal for each determined WUS monitoring occasion indicates that the UE is to wake-up and identifies the SCells to be brought out of dormancy.

Clause 56. A non-transitory computer readable storage medium including program code stored thereon, the program code is operable to configure at least one processor in a serving base station for supporting a primary serving cell (PCell) for positioning a user equipment (UE) operating with wake-up signal (WUS) configurations in a discontinuous reception (DRX) mode during a positioning session, the program code comprising instructions to: send to the UE a WUS configuration including a dormancy list of secondary serving cells (SCells) for the UE that are configured for dormancy; receive from a location server an indication of one or more SCells that are to be used for positioning for the UE; remove one or more of the SCells on the dormancy list from dormancy during the positioning session based on the indication received from the location server.

Clause 57. The non-transitory computer readable storage medium of clause 56, wherein the program code further comprises instructions to send the dormancy list to the location server.

Clause 58. The non-transitory computer readable storage medium of either of clauses 56 or 57, wherein the indication of the one or more SCells that are to be used for positioning for the UE comprises an indication of the one or more of the SCells to remove from the dormancy list.

Clause 59. The non-transitory computer readable storage medium of clause 58, wherein the instructions to remove the one or more of the SCells on the dormancy list from dormancy comprises instructions to update the WUS configuration to remove the one or more of the SCells on the dormancy list.

Clause 60. The non-transitory computer readable storage medium of clause 59, wherein the program code further comprises instructions to: receive from the location server a time period during which the SCells are to be removed from the dormancy list; and update the WUS configuration after the time period to include the one or more of the SCells on the dormancy list.

Clause 61. The non-transitory computer readable storage medium of any of clauses 56-60, wherein the indication of the one or more SCells that are to be used for positioning for the UE comprises an indication of at least one uplink SRS to be transmitted by the UE to one or more SCells for uplink measurement, downlink reference signals to be transmitted by the one or more SCells to the UE for downlink measurement, or a combination thereof.

Clause 62. The non-transitory computer readable storage medium of clause 61, wherein the instructions to remove the one or more of the SCells on the dormancy list from dormancy comprises instructions to send a WUS signal to the UE to wake-up and to bring all SCells on the dormancy list out of dormancy for all WUS monitoring occasions during the positioning session.

Clause 63. The non-transitory computer readable storage medium of clause 61, wherein the program code further comprises instructions to: determine WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof; and send a WUS signal to the UE to wake-up and to bring the specific SCells on the dormancy list out of dormancy for the determined WUS monitoring occasions.

Clause 64. The non-transitory computer readable storage medium of clause 63, wherein the WUS signal for each determined WUS monitoring occasion indicates that the UE is to wake-up and identifies the SCells to be brought out of dormancy.

Clause 65. A method performed by a user equipment (UE) for positioning while operating with wake-up signal (WUS) configurations in a discontinuous reception (DRX) mode during a positioning session, comprising: receiving from a serving base station supporting a primary cell (PCell) a WUS configuration including a dormancy list of secondary serving cells (SCells) for the UE that are configured for dormancy; receiving a capabilities request message from a location server during the positioning session; and sending a capabilities response message to the location server with the dormancy list.

Clause 66. A user equipment (UE) configured for positioning while operating with wake-up signal (WUS) configurations in a discontinuous reception (DRX) mode during a positioning session, comprising: a wireless transceiver configured to wirelessly communicate with base stations in a wireless network; at least one memory; at least one processor coupled to the wireless transceiver and the at least one memory, wherein the at least one processor is configured to: receive, via the wireless transceiver, from a serving base station supporting a primary cell (PCell) a WUS configuration including a dormancy list of secondary serving cells (SCells) for the UE that are configured for dormancy; receive, via the wireless transceiver, a capabilities request message from a location server during the positioning session; and send, via the wireless transceiver, a capabilities response message to the location server with the dormancy list.

Clause 67. A user equipment (UE) configured for positioning while operating with wake-up signal (WUS) configurations in a discontinuous reception (DRX) mode during a positioning session, comprising: means for receiving from a serving base station supporting a primary cell (PCell) a WUS configuration including a dormancy list of secondary serving cells (SCells) for the UE that are configured for dormancy; means for receiving a capabilities request message from a location server during the positioning session; and means for sending a capabilities response message to the location server with the dormancy list.

Clause 68. A non-transitory computer readable storage medium including program code stored thereon, the program code is operable to configure at least one processor in a user equipment (UE) for positioning while operating with wake-up signal (WUS) configurations in a discontinuous reception (DRX) mode during a positioning session, the program code comprising instructions to: receive from a serving base station supporting a primary cell (PCell) a WUS configuration including a dormancy list of secondary serving cells (SCells) for the UE that are configured for dormancy; receive a capabilities request message from a location server during the positioning session; and send a capabilities response message to the location server with the dormancy list.

Therefore, it is intended that claimed subject matter not be limited to the particular examples disclosed, but that such claimed subject matter may also include all aspects falling within the scope of appended claims, and equivalents thereof.

What is claimed is:

1. A method performed by a location server for positioning a user equipment (UE) operating with wake-up signal (WUS) configurations in a discontinuous reception (DRX) mode during a positioning session, comprising:
   receiving a dormancy configuration for secondary serving cells (SCells) for the UE in a WUS configuration for the UE; and
   in response to the dormancy configuration for the SCells for the UE, performing one of:
   A) configuring and sending to the UE assistance data and scheduling uplink sounding reference signals (SRSs) for SCells that are not included in the dormancy configuration for the SCells for the UE; or
   B) sending an indication to a serving base station for the UE supporting a primary serving cell (PCell) for the UE to remove one or more SCells from the dormancy configuration during the positioning session; or
   C) sending an indication to the serving base station for the UE supporting the PCell for the UE to bring one or more SCells out of dormancy for one or more WUS monitoring occasions during the positioning session.

2. The method of claim 1, further comprising:
   receiving location measurements for the UE from one or more other entities; and
   determining a location for the UE based on the location measurements.

3. The method of claim 1, wherein the dormancy configuration is received from the UE in a capabilities message.

4. The method of claim 1, wherein the dormancy configuration is received from the serving base station for the UE.

5. The method of claim 1, wherein the location server sends the indication to the serving base station for the UE to remove the one or more SCells from the dormancy configuration during the positioning session, further comprising sending a time period during which the one or more SCells are removed from the dormancy configuration.

6. The method of claim 1, wherein the location server sends the indication to the serving base station for the UE to bring the one or more SCells out of dormancy for the one or more WUS monitoring occasions during the positioning session, where the location server indicates to bring all SCells out of dormancy for all WUS monitoring occasions during the positioning session.

7. The method of claim 1, wherein the location server sends the indication to the serving base station for the UE to bring the one or more SCells out of dormancy for the one or more WUS positioning occasions during the positioning session, where the location server indicates at least one uplink SRS to be transmitted by the UE for the one or more SCells for uplink measurement, downlink reference signals to be transmitted in the one or more SCells to the UE for downlink measurement, or a combination thereof.

8. A location server configured for positioning a user equipment (UE) operating with wake-up signal (WUS) configurations in a discontinuous reception (DRX) mode during a positioning session, comprising:
- an external interface configured to wirelessly communicate with base stations in a wireless network;
- at least one memory;
- at least one processor coupled to the external interface and the at least one memory, wherein the at least one processor is configured to:
- receive, via the external interface, a dormancy configuration for secondary serving cells (SCells) for the UE in a WUS configuration for the UE; and
- in response to the dormancy configuration for the SCells for the UE, the at least one processor is configured to performs one of:
  - A) configure and send, via the external interface, to the UE assistance data and scheduling uplink sounding reference signals (SRSs) for SCells that are not included in the dormancy configuration for the SCells for the UE; or
  - B) send, via the external interface, an indication to a serving base station for the UE supporting a primary serving cell (PCell) for the UE to remove one or more SCells from the dormancy configuration during the positioning session; or
  - C) send, via the external interface, an indication to the serving base station for the UE supporting the PCell for the UE to bring one or more SCells out of dormancy for one or more WUS monitoring occasions during the positioning session.

9. The location server of claim 8, wherein the at least one processor is further configured to:
- receive, via the external interface, location measurements for the UE from one or more other entities; and
- determine a location for the UE based on the location measurements.

10. The location server of claim 8, wherein the dormancy configuration is received from the UE in a capabilities message.

11. The location server of claim 8, wherein the dormancy configuration is received from the serving base station for the UE.

12. The location server of claim 8, wherein the location server sends the indication to the serving base station for the UE to remove the one or more SCells from the dormancy configuration during the positioning session, wherein the at least one processor is further configured to send, via the external interface, a time period during which the one or more SCells are removed from the dormancy configuration.

13. The location server of claim 8, wherein the location server sends the indication to the serving base station for the UE to bring the one or more SCells out of dormancy for the one or more WUS monitoring occasions during the positioning session, where the location server indicates to bring all SCells out of dormancy for all WUS monitoring occasions during the positioning session.

14. The location server of claim 8, wherein the location server sends the indication to the serving base station for the UE to bring the one or more SCells out of dormancy for the one or more WUS positioning occasions during the positioning session, where the location server indicates at least one uplink SRS to be transmitted by the UE for the one or more SCells for uplink measurement, downlink reference signals to be transmitted in the one or more SCells to the UE for downlink measurement, or a combination thereof.

15. A method performed by a serving base station supporting a primary serving cell (PCell) for positioning a user equipment (UE) operating with wake-up signal (WUS) configurations in a discontinuous reception (DRX) mode during a positioning session, comprising:
- sending to the UE a WUS configuration including a dormancy list of secondary serving cells (SCells) for the UE that are configured for dormancy;
- receiving from a location server an indication of one or more SCells that are to be used for positioning for the UE; and
- removing one or more of the SCells on the dormancy list from dormancy during the positioning session based on the indication received from the location server.

16. The method of claim 15, further comprising sending the dormancy list to the location server.

17. The method of claim 15, wherein the indication of the one or more SCells that are to be used for positioning for the UE comprises an indication of the one or more of the SCells to remove from the dormancy list.

18. The method of claim 17, wherein removing the one or more of the SCells on the dormancy list from dormancy comprises updating the WUS configuration to remove the one or more of the SCells on the dormancy list.

19. The method of claim 18, further comprising:
- receiving from the location server a time period during which the SCells are to be removed from the dormancy list; and
- updating the WUS configuration after the time period to include the one or more of the SCells on the dormancy list.

20. The method of claim 15, wherein the indication of the one or more SCells that are to be used for positioning for the UE comprises an indication of at least one uplink SRS to be transmitted by the UE to one or more SCells for uplink measurement, downlink reference signals to be transmitted by the one or more SCells to the UE for downlink measurement, or a combination thereof.

21. The method of claim 20, wherein removing the one or more of the SCells on the dormancy list from dormancy comprises sending a WUS signal to the UE to wake-up and to bring all SCells on the dormancy list out of dormancy for all WUS monitoring occasions during the positioning session.

22. The method of claim 20, further comprising:
- determining WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof; and
- sending a WUS signal to the UE to wake-up and to bring the specific SCells on the dormancy list out of dormancy for the determined WUS monitoring occasions.

23. The method of claim 22, wherein the WUS signal for each determined WUS monitoring occasion indicates that the UE is to wake-up and identifies the SCells to be brought out of dormancy.

24. A serving base station configured for supporting a primary serving cell (PCell) for positioning a user equipment (UE) operating with wake-up signal (WUS) configurations in a discontinuous reception (DRX) mode during a positioning session, comprising:
- an external interface configured to wirelessly communicate with entities in a wireless network;

at least one memory;

at least one processor coupled to the external interface and the at least one memory, wherein the at least one processor is configured to:

send, via the external interface, to the UE a WUS configuration including a dormancy list of secondary serving cells (SCells) for the UE that are configured for dormancy;

receive, via the external interface, from a location server an indication of one or more SCells that are to be used for positioning for the UE; and remove one or more of the SCells on the dormancy list from dormancy during the positioning session based on the indication received from the location server.

25. The serving base station of claim 24, wherein the at least one processor is further configured to send, via the external interface, the dormancy list to the location server.

26. The serving base station of claim 24, wherein the indication of the one or more SCells that are to be used for positioning for the UE comprises an indication of the one or more of the SCells to remove from the dormancy list.

27. The serving base station of claim 26, wherein the at least one processor is configured to remove the one or more of the SCells on the dormancy list from dormancy by being configured to update the WUS configuration to remove the one or more of the SCells on the dormancy list.

28. The serving base station of claim 27, wherein the at least one processor is further configured to:

receive, via the external interface, from the location server a time period during which the SCells are to be removed from the dormancy list; and update the WUS configuration after the time period to include the one or more of the SCells on the dormancy list.

29. The serving base station of claim 24, wherein the indication of the one or more SCells that are to be used for positioning for the UE comprises an indication of at least one uplink SRS to be transmitted by the UE to one or more SCells for uplink measurement, downlink reference signals to be transmitted by the one or more SCells to the UE for downlink measurement, or a combination thereof.

30. The serving base station of claim 29, wherein the at least one processor is configured to remove the one or more of the SCells on the dormancy list from dormancy comprises send, via the external interface, a WUS signal to the UE to wake-up and to bring all SCells on the dormancy list out of dormancy for all WUS monitoring occasions during the positioning session.

31. The serving base station of claim 29, wherein the at least one processor is further configured to:

determine WUS monitoring occasions to wake-up the UE and bring specific SCells on the dormancy list out of dormancy based on the indication of at least one uplink SRS to be transmitted by the UE to the one or more SCells for uplink measurement, the downlink reference signals to be transmitted by the one or more SCells to the UE for downlink measurement, or the combination thereof; and send, via the external interface, a WUS signal to the UE to wake-up and to bring the specific SCells on the dormancy list out of dormancy for the determined WUS monitoring occasions.

32. The serving base station of claim 31, wherein the WUS signal for each determined WUS monitoring occasion indicates that the UE is to wake-up and identifies the SCells to be brought out of dormancy.

* * * * *